US005207412A

United States Patent [19]

Coons, Jr. et al.

[11] Patent Number: 5,207,412

[45] Date of Patent: May 4, 1993

[54] MULTI-FUNCTION DOCUMENT INTEGRATER WITH CONTROL INDICIA ON SHEETS

[75] Inventors: Robert A. Coons, Jr., Bloomfield; Charles E. Conrad, Scottsville; James B. Myers, Fairport; Susan W. Baxter, Rochester, all of N.Y.

[73] Assignee: Xerox Corporation, Stamford, Conn.

[21] Appl. No.: 796,524

[22] Filed: Nov. 22, 1991

[51] Int. Cl.[5] .......................... B65H 5/30; G06F 15/20

[52] U.S. Cl. .......................................... 270/1.1; 270/45; 270/55; 270/57; 270/58; 271/10; 364/478

[58] Field of Search ....................... 270/32, 37, 45, 46, 270/51, 52, 53, 54, 57, 58, 59; 364/471, 478, 468; 271/4, 10, 256, 258, 259, 265

[56] References Cited

U.S. PATENT DOCUMENTS 3,804,005 4/1974 Burger et al. .
3,934,867 1/1976 Oeschger .............................. 270/32
4,248,525 2/1981 Sterrett .
4,273,319 6/1981 Stocker ................................ 270/32
4,330,197 5/1982 Smith et al. .
4,352,012 9/1982 Verderber et al. .
4,430,563 2/1984 Harrington .
4,602,776 7/1986 York et al. ............................. 271/4
4,609,283 9/1986 Murata et al. .
4,757,348 7/1988 Rourke et al. .
4,800,505 1/1989 Axelrod ............................. 364/478
4,800,506 1/1989 Axelrod ............................... 270/58
4,847,656 7/1989 Kuno et al. .
4,939,354 7/1990 Priddy et al. .
4,942,535 7/1990 Francisco ........................... 364/478
4,961,092 10/1990 Rabb et al. .
4,970,554 11/1990 Rourke .
4,987,447 1/1991 Ojha .
4,989,852 2/1991 Gunther ............................... 270/58
5,051,779 9/1991 Hikawa .
5,080,340 1/1992 Hacknauer et al. .
5,157,617 10/1992 Ramsey ............................ 270/45 X

*Primary Examiner*—Edward K. Look
*Assistant Examiner*—John Ryznic
*Attorney, Agent, or Firm*—Oliff & Berridge

[57] ABSTRACT

Embedded intelligence in the form of machine readable indicia printed on at least some of the sheets of a document is used by a document integrating device to control a feeding operation performed by the document integrating device. Regular sheets located in the document immediately preceding the location of an insert sheet are output with machine readable information indicative of the subsequent location in the document of an insert sheet. These regular sheets are then supplied to a document integrater (either in a stack or as they are output from an imaging device). A first scanner in the document integrater scans the regular sheets as they are fed from an inlet (having, for example, a regular sheet feeder unit). When a regular sheet located in the document immediately prior to an insert sheet is fed from the inlet, the machine readable information indicative of the subsequent insert sheet is read by the first scanner. A controller of the document integrater then switches from feeding sheets from the regular sheet inlet to an insert sheet feeder unit containing insert sheets. The last insert sheet for each insert location in the document includes machine readable information thereon which causes the controller to switch back to feeding the regular sheets from the regular sheet inlet (or from some other insert sheet feeder unit).

33 Claims, 10 Drawing Sheets

MULTI-FUNCTION DOCUMENT INTEGRATER WITH CONTROL INDICIA ON SHEETS

BACKGROUND OF THE INVENTION

1. Field of the Invention

The present invention relates to methods and apparatus for handling documents, and in particular to methods and apparatus for automatically assembling multi-sheet documents having a variety of different types of sheets. The present invention is also directed to methods and apparatus for integrating two or more collated partial document sets into one collated complete set containing multiple copies of the document, wherein the operations performed on the sheets to form the complete document set are controlled by machine readable indicia preprinted on the sheets.

2. Description of Related Art

With the general increase in quality, speed and capabilities of modern day copiers and printers, a need has developed for document finishing devices capable of being adapted to perform a variety of different jobs. For example, it may be necessary to incorporate insert materials such as, for example, photographs, chapter dividers, specially colored sheets, and oversize sheets (containing, for example, drawings or diagrams) into a document comprised primarily of regular (e.g., 8½×11" or A4 size) sheets. As an example, technical manuals often include one or more oversize insert sheets containing schematic diagrams which fold out of the manual during use. These insert sheets could be printed by the same machine that prints the regular size sheets, or by some other machine. Even when produced by the same machine, the insert sheets are usually not printed at the same time the regular size sheets are printed since switching between printing regular size and "special" (e.g., oversize) insert sheets reduces the efficiency of the printer or copier, or simply cannot be done. For example, inserts may be produced on a machine capable of color reproduction, whether a xerographic process or printing press, or a machine that produces oversize documents. If the oversize documents are produced such that they are collated with the "normal" size documents, then the collated stack contains "normal" size sheets mixed with unfolded oversize sheets. Not only is this a difficult problem to solve, but the printer is slowed down as it switches back and forth between the sizes as it prints. This switching problem exists whenever the insert sheets are printed on a medium different from the regular sheets. Accordingly, insert sheets usually must be printed separately from the regular sheets.

Consider as an example of a document, a multi-page service manual containing text printed on 8½×11" sheets, and schematic diagrams printed on 11×17" sheets which are Z-folded so as to reside within the 8½×11" document during storage. FIG. 1 illustrates such a document 20. Document 20 includes a binder 26 which includes a back cover **26*a*. A cover sheet 25 which, for example, can be a transparent plastic cover and/or a colored paper sheet encloses, with the binder 26, a plurality of sheets 24*a*–24*e*. Sheets 24*a*, 24*c* and 24*e* are 8½×11" sheets which contain text. Sheets 24*b* and 24*d* are Z-folded 11×17" sheets containing, for example, schematic diagrams. Sheet 24*b* has been unfolded. Sheet 24*d* illustrates the manner in which a Z-folded sheet is stored. As an alternative, the oversize sheets could be C-folded 11×16" sheets 24*f* as illustrated in FIG. 1A. (It would be unusual to C-fold 11×17" sheets since both edges would be bound by binder 26**.)

If the illustrative service manual had 100 pages, with pages 20, 33, 34, 35, 40, 70–75 and 91 being Z-folded 11×17" schematic diagrams, and the remaining sheets being 8½×11" sheets containing text, the 8½×11" sheets would typically be printed in collated fashion (i.e., in sets containing sheets 1–19, 21–32, 36–39, 41–69, 76–90, 92–100), and the oversize sheets would be inserted later. As mentioned above, the oversize sheets could be printed by the same machine which printed the regular size sheets, or by a different machine. The need to insert sheets is also applicable to sheets other than oversize sheets such as, for example, sheets having tabs, or a different color or weight than the "regular sheets".

U.S. Pat. No. 4,248,525 to Sterrett discloses an apparatus for producing sets of collated copies wherein some of the sheets in a document (regular sheets) can be reproduced in a collating mode by means of a copier having a recirculating document handler (RDH), while other sheets in the document (insert sheets) cannot be produced in a collating mode by the RDH. Each sheet which cannot be imaged using the RDH is first individually copied multiple times and fed to a separate storage bin. These sheets later will be inserted into the stream of collated regular sheets as they are copied and output from the copier. A controller is preprogrammed with the page numbers of the sheets to be inserted. The regular size sheets are then placed (in order) in the RDH, and multiple collated copies are made and fed toward a finisher (stapler). Copies of the regular size sheets in the document are thus output from the copier in order (collated), with the insert sheets missing. Since the controller keeps track of the number of the sheet being copied, the controller is able to temporarily stop the RDH at the appropriate time and cause the appropriate insert sheet to be fed from its corresponding storage bin into the stream of regular sheets output from the copier. Thus, collated complete copies of a document are formed.

The apparatus of U.S. Pat. No. 4,248,525 requires that the controller be preprogrammed for each job. Additionally, a number of storage bins equal to the number of different insert sheets in the document are required. Even if all insert sheets are of the same type (e.g., all are oversize sheets), a separate bin is provided for each sheet to b inserted into the copied document.

U.S. Pat. No. 4,602,776 to York et al, assigned to Xerox Corporation, discloses an insertion apparatus for use with a copier and/or a collator for providing on-line and off-line insertion of sheet material or collation, respectively. A supply tray is loaded with one or more types of insert material, each type being separated by a first type of coded sheet. A copying operation is interrupted when a second type of coded sheet, located in the stack to be copied and indicating a location where insert sheets are to be inserted, is detected. As the insert sheets are fed, a second sensor detects the first type of coded sheet (indicating the end of a group of insert sheets), which is then fed to an overflow tray. The normal copying operation is then resumed.

The device disclosed in U.S. Pat. No. 4,602,776 requires a collator. Each regular sheet is imaged multiple times (depending on the number of copies desired or the collator capacity) before the next sheet is imaged. When a coded sheet in the stack to be copied is reached (indicating that an insertion operation should take place), multiple copies of the uppermost insertion sheet located in the insert supply tray are fed to the collator. Any excess insertion sheets contained in the insert supply tray, as well as the coded sheet indicating the end of a group of insertion sheets, must be fed to the overflow tray. The overflow tray and the collator increase the size of the apparatus, as well as require appropriate sheet paths, increasing the likelihood of paper jams and other breakdowns occurring. Since RDHs enable the production of multiple collated copies of a document, it is preferable to provide a system which utilizes this advantage of RDHs.

U.S. Pat. No. 4,961,092 to Rabb et al, assigned to Xerox Corporation, discloses a pre-programmed post collation copying system for a copier which uses plural sorter bins and a recirculating document handler. Pre-programmable pause points in the copying operation allow for insertion of a variable number of job inserts or other special copy sheets into the bins being filled (by producing copies of these special documents or by manually inserting them into the bins), repeatably, at any selected document copying point. This patent also requires a collator, and thus has the disadvantages associated therewith. Additionally, the copying sequence must be manually restarted after the appropriate insertion operation is completed.

U.S. Pat. No. 4,609,283 to Murata et al discloses a copying apparatus having a control panel for programming copying functions which can be stored with a specific code indicia and then placed on a "mode card" incorporated in the document. The "mode card" is inserted into the copying apparatus and upon sensing of the coded indicia, the preprogrammed copier function is enabled. The program can self-correct magnification ratios or control a paper sorter bin.

U.S. Pat. No. 4,847,656 to Kuno et al discloses a method and apparatus for controlling copying operation modes of a copier having a paper feeding device. A data sheet containing information of a desired copy mode is fed to a copying section of the copier. The information on the data sheet is detected and the subsequent original papers are processed according to the desired copying mode designated by the information on the data sheet.

Other patents of interest include U.S. Pat. Nos.: 3,804,005 to Burger et al; 4,330,197 to Smith et al; 4,352,012 to Verderber et al; 4,430,563 to Harrington; 4,939,354 to Priddy et al; and 5,051,779 to Hikawa.

OBJECTS AND SUMMARY OF INVENTION

It is an object of the present invention to provide a method and apparatus for integrating two or more partial document sets into one set, or stack, containing multiple complete copies of a document.

It is another object of the present invention to provide a document integrater for integrating two or more partial document sets which operates based upon intelligence embedded on the handled sheets, so that no preprogramming of the document integrater is required.

It is another object of the present invention to provide apparatus and method for inserting "special" insert sheets into a collated stream of "regular" sheets as they are directed toward an output stack containing complete collated sets of the document.

It is another object of the present invention to provide apparatus and method for achieving the above results while performing additional finishing steps on the sheets prior to placing the sheets in the output stack.

It is a further object of the present invention to provide a method for producing multiple collated copies of a document having insert sheets which cannot be produced at the same time as "regular" sheets.

To achieve the foregoing and other objects, and to overcome the shortcomings discussed above, embedded intelligence in the form of machine readable indicia printed on at least some of the sheets of a document is used by a document integrating device to control a feeding operation performed by the document integrating device. When it is not possible to produce a collated copy of a document in its entirety at one time by an imaging device (copier or printer), the sheets in the document which can be produced in collated seriatim fashion (the regular sheets) are output as a continuous stream, possibly forming a stack. The regular sheets located in the document immediately preceding the location of an insert sheet are output with machine readable information indicative of the subsequent location in the document of an insert sheet. These regular sheets are then supplied to a document integrater (either in a stack or as they are output from the imaging device). A first scanner in the document integrater scans the regular sheets as they are fed from an inlet (having, for example a regular sheet feeder unit upstream thereof). When a regular sheet located in the document immediately prior to an insert sheet is fed from the inlet, the machine readable information indicative of the subsequent insert sheet is read by the first scanner. A controller of the document integrater then switches from feeding sheets from the regular sheet inlet to an insert sheet feeder unit containing insert sheets. The last insert sheet for each insert location in the document includes machine readable information thereon which causes the controller to switch back to feeding the regular sheets from the regular sheet inlet (or from some other insert sheet feeder unit). The switching of sheet feeding continues, based on the machine readable indicia on the fed sheets, until an end-of-job instruction is read from the last sheet to be fed.

The document integrater is capable of performing multiple jobs without any preprogramming since the information regarding the sheet feeding operation is obtained directly from the sheets. Additionally, by operating the document integrater "in-line" with the printing system which produces the multiple partial sets of the document, or "off-line" but shortly after the partial sets are printed, the disclosed document integrater facilitates "just-in-time" printing. This eliminates the need to inventory printed sheets.

Preferably, the machine readable information is provided on a bound portion of the sheets so that when the document is bound, the machine readable information is hidden from view.

The insert sheets can be contained in one or more insert sheet feeder units. If all of the sheets to be inserted are of the same type (e.g., when all insert sheets are oversize sheets having the same size), even if a plurality of sheets are to be inserted into each document at a plurality of separated locations in the document, all of the insert sheets can be contained in a single insert sheet feeder unit. When more than one insert sheet for the document is contained in a single insert sheet feeder unit, these insert sheets are provided to the insert sheet feeder unit in collated form. This reduces the number of feeder units required by the document integrater.

When the insert sheets are oversize sheets, the document integrater can include a sheet folder for folding the oversize sheets so that they will fit within the confines of the regular size sheets of the document. The folder can, for example, Z-fold or C-fold the oversize sheets prior to integration of the oversize sheets with the regular sheets. When a sheet folder is provided, it is preferable to also provide a sheet inverter downstream of the sheet folder to maintain the proper orientation of the folded sheets.

By converging the sheet paths from each feeder unit into a common sheet path prior to placement of the sheets onto the output sheet stacker, finishing devices such as, for example, hole punchers, perforaters, slitters, and/or staplers can be provided along the common sheet path for performing finishing operations on all the sheets of the document.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENTS

One preferred embodiment of the present invention will now be described. The described embodiment is capable of inserting oversize insert sheets into a stream of regular size sheets fed from an inlet. The oversize sheets are folded and inverted prior to insertion into a common sheet path which then carries the collated regular and oversized sheets to a hole puncher, and then to a stacker tray. Operation of the sheet folder, sheet inverters, hole punchers and sheet stacker tray are conventional. The present invention is mainly directed to the manner in which sheets are fed from a plurality of sources. Accordingly, it is understood that the present invention is applicable to document integraters which do not include sheet folders or inverters (a sheet inverter adjacent to the stacker tray may be required), as well as to document integraters having additional finishing devices therein. Accordingly, the described embodiment is intended to be illustrative, not limiting.

Figure 1:
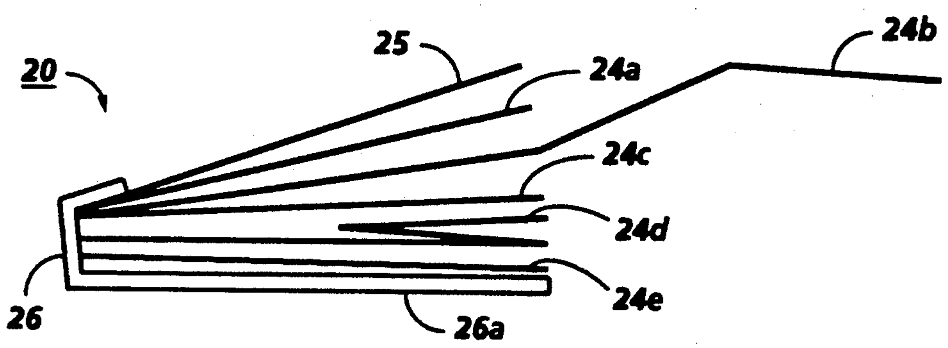
FIG. 1 is an end view of a document containing regular sheets and oversize insert sheets, with one of the insert sheets in the unfolded position, and another of the insert sheets in the folded position.
Figure 1A:
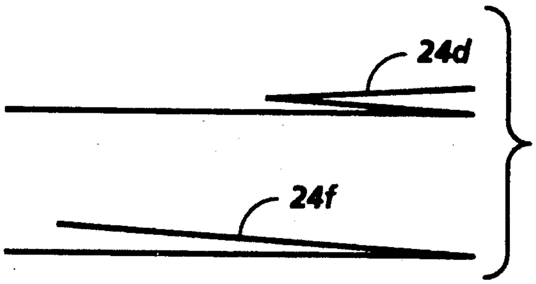
FIG. 1A is an end view of a Z-folded sheet and a C-folded sheet, respectively.
Figure 2:
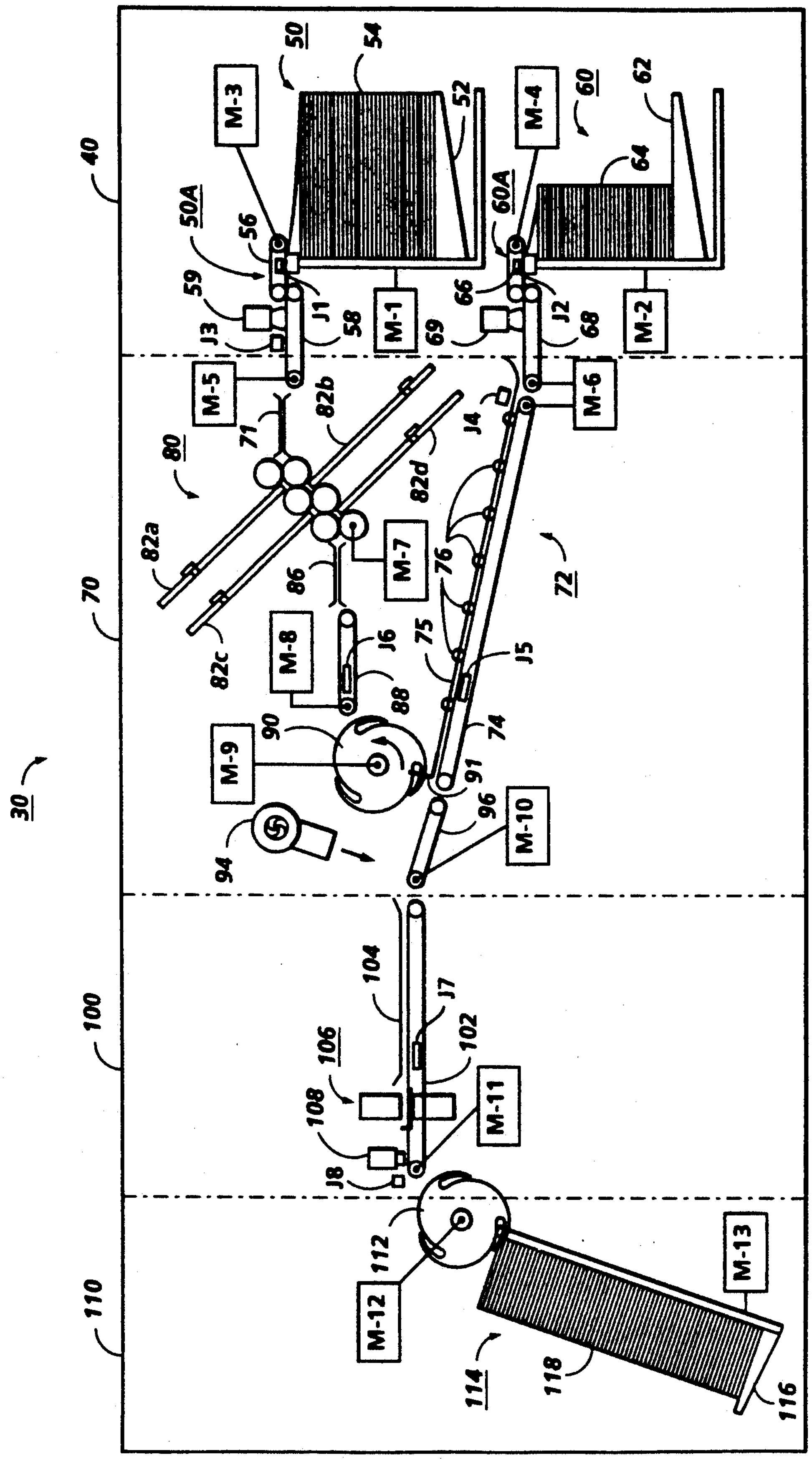
FIG. 2 is a side schematic view of a document integrater according to the present invention which is capable of folding and inverting oversize insert sheets, and punching holes in all of the sheets prior to placement of the sheets into a sheet stacker tray.

With reference to FIG. 2, a document integrater 30 includes: a feeder module 40 for selectively alternately feeding sheets from either regular sheet feeder unit 60 or oversize insert sheet feeder unit 50; a folder module 70 including a sheet folder 80 for folding oversize sheets, a sheet inverter 90 for inverting folded oversize sheets and placing them on an endless belt vacuum transport 96, and a ball-on-belt type conveyor 72 for conveying the regular sheets to the vacuum transport 96; a punch module 100 including a hole puncher 106 for registering and punching holes in each sheet conveyed from vacuum transport 96; and a stacker module 110 including a sheet inverter 112 for inverting and inserting each punched sheet into a stacker tray 114. As mentioned above, the folder 80, sheet inverter 90 and punch module 100 are not required to practice the present invention since the insert sheets may not require folding. In addition to (or as an alternative to) oversize insert sheets, the insert sheets could be the same size as the sheets contained in regular sheet feeder unit 60, but could differ in some other characteristic from the regular sheets in stack 64. For example, the insert sheets in stack 54 could have a different weight or color than the regular sheets in stack 64. Additionally, the insert sheets could include tabs, or be photographs. The distinguishing feature between the insert sheets and the regular sheets is that for some reason, the insert sheets were not produced during the same printing operation as the regular sheets (otherwise there would be no need to produce these sheets into different stacks). For example, it may have been technically possible, but more time consuming.

At least one insert sheet feeder unit 50 is provided. However, it is also possible to have multiple insert sheet feeder units if, for example, different supplies of insert sheets are provided.

Each feeder unit in the feeder module 40 includes similar structure and control. With reference to FIG. 2, each feeder unit 50, 60 can be, for example, a Xerox 5090 high capacity vacuum feeder, well known in the art. For more details on vacuum feeders usable in the present invention see, for example, U.S. Pat. No. 4,589,647 to George J. Roller, assigned to the same assignee as the present invention. Accordingly, the disclosure of U.S. Pat. No. 4,589,647 is incorporated herein by reference. With reference to insert sheet feeder unit 50, each Xerox 5090 high capacity vacuum feeder includes an elevator tray 52 which is vertically moved by a first motor M-1. A stack height sensor (not shown) monitors the top of the stack 54 of insert sheets, and is used to control motor M-1 to maintain the top of the stack at a predetermined level. Motor M-1 is controlled in a conventional way based upon the detected stack height, or based upon a LOWER TRAY signal provided by an operator (by, for example, pressing a key on a control panel) which causes motor M-1 to lower tray 52 to its lowermost position. When in the lowermost position, a tray locking solenoid (not shown) releases tray 52 from its locked position so that it can be moved horizontally through a door (not shown) of the feeder module 40 for replacement of insert sheets. Insert sheet feeder unit 50 also includes a sheet feeder 50A.

In response to a sheet feed signal, the uppermost sheet in the insert sheet feeder unit 50 is removed from the stack 54 by the sheet feeder 50A. An air blower acts as an air knife by directing a stream of air between the first few uppermost sheets in stack 54 to cause these sheets to be separated from the stack. Simultaneously, a vacuum is applied through feeder belt 56 to draw the uppermost sheet in the stack into contact with belt 56. A sheet feeder motor M-3 then rotates endless belt 56 to remove the uppermost sheet from stack 54. Endless belt 56 is rotated in a conventional manner by temporarily disengaging a clutch (not shown) to permit belt 56 to rotate through one cycle and remove one sheet from stack 54. The insert sheet is thus fed from stack 54 and through an inlet onto a vacuum transport 58.

The above operation of sheet feeder unit 50 is conventional, and well known in the art. Regular sheet feeder unit 60 includes an elevator tray 62, an elevator motor M-2, a sheet feeder 60A including an endless vacuum belt 66, and a sheet feeder motor M-4 similar to that described above with respect to insert sheet feeder unit 50. Of course, other sheet feeders for feeding sheets from a stack can be provided. See, for example, U.S. Pat. No. 4,807,868 to Hirst et al, assigned to Xerox Corporation, the disclosure of which is incorporated herein by reference. The feeder of Hirst et al feeds sheets seriatim from the top of a stack without using vacuum or an air knife. Since the stacks of sheets 54,64 are large (up to 2500 sheets per feeder tray) it is preferable to feed sheets from the top of the stack.

Once removed from its feeder unit, each sheet is then fed onto a vacuum transport 58 or 68 which is rotated by a corresponding motor M-5 or M-6. The vacuum transports ports 58, 68 include respective sheet inlets, and hold a sheet flat thereon by applying vacuum through an endless rotatable belt. A scanner 59 or 69 is provided over each vacuum transport 58, 68 for reading the machine readable indicia provided on the sheets. Accordingly, the machine readable data (which can be in the form of, for example, a bar code) is provided on the upwardly facing side of each sheet as placed in sheet feeder units 50, 60. However, the machine readable indicia alternatively could be placed on the bottom surface of the sheets if other transport methods were used, and the sheet scanners were located below the sheet path.

In the present example, the sheets are provided in each feeder unit 50, 60 with their image side facing up, and with the bar codes located on the image side adjacent to a leading edge of each sheet. The leading edge of each sheet will be bound by a document binder, thus the bar code will be hidden when each sheet is bound into a document. Of course, other means of machine readable indicia are possible, such as optical mark recognition (OMR). This may not be objectionable to the ultimate user, so may be placed anywhere on the sheets. Further, the operator may want to use manual methods to read indicia at some later time. This could require code placement elsewhere on the sheet. If the sheets are duplex sheets having images on both sides, the side of the sheet having the lower page number faces upward. Thus, the sheets are fed from each sheet feeder unit in 1-N order. As the sheets reach stacker module 110, their image side still faces upward. Therefore, the sheets are inverted by a sheet inverter 112 prior to being stacked in stacker tray 114. Of course, the sheets can be arranged in other manners, as long as: (a) the machine readable indicia is provided on the side of the sheet which faces upward when in sheet feeder units 50, 60 (when the scanners 59, 69 are located above the sheets); and (b) the resulting stack 118 is in collated order. Since it is preferable to locate the bar code on the bound portion of sheets, and sheets containing tabs must be fed with their straight edge (the bound edge) first, placement of the sheets in feeder units 50, 60 with their bound, coded-edge as the leading edge enables the integrater to be adaptable to the largest variety of jobs. Additionally, placing the code on the leading edge of the sheets results in the sheets being read by scanners 59 and 69 early in the sheet feeding cycle.

The regular sheets are conveyed by vacuum transport 68 to a ball-on-belt transport 72. Ball-on-belt transport 72 includes an endless belt 74 rotated by motor M-6 and a housing 75 which includes a plurality of rollers 76 which contact and are rotated by endless belt 74. As a sheet is placed between housing 75 and endless belt 74, the rollers 76 maintain the sheet in contact with endless belt 74 so that the sheet is conveyed along belt 74. Other sheet transport mechanisms can be utilized as an alternative to the ball-on-belt transport 72. Transport 72 then conveys the regular sheets to a common sheet transport defined by vacuum transports 96 and 102.

The oversize insert sheets from stack 54 are conveyed along vacuum transport 58 through chute 71 and into a sheet folder 80. The illustrated sheet folder is a Baumfolder L-16 folder having four folding plates 82*a*, 82*b*, 82*c*, 82*d* and six fold rollers which are rotated by folder motor M-7. Each folder plate 82*a–d* includes an entrance gate (not shown) for blocking or admitting sheets into the folder plate, and an adjustable stop gate which limits the distance a sheet is inserted into each folder plate. The folder 80 is operated in a conventional manner to Z-fold sheets, C-fold sheets or permit sheets to pass therethrough without being folded. A conventional inlet sheet detector (not shown) is provided adjacent to the entrance of folder 80 to trigger any gates which need to be activated within folder 80 to perform a predetermined folding procedure.

Other types of sheet folders could be substituted for the Baumfolder L-16 folder illustrated in FIG. 2. For example, the single-fold plate, bi-roll folder with Z-fold capability disclosed in allowed U.S. Pat. No. 5,076,556 to Barry Paul Mandel, the disclosure of which is incorporated herein by reference, could be used as sheet folder 80.

After passing through sheet folder 80, the sheets are conveyed through chute 86 onto vacuum transport 88. Vacuum transport 88, like transports 58, 68, 96 and 102 includes an endless belt having a plurality of apertures therein through which a vacuum is applied, and a motor M-8 for rotating the endless belt.

The folded oversize sheets are then inserted into a slot of rotating sheet inverter disk 90, which then rotates to invert the oversize folded sheet. The sheet is stripped from the inverter disk when the slot containing the folded oversize sheet passes through a stripping wall 91. Inverter motor M-9 rotates inverter disk 90, and includes a clutch which is actuated to cause inverter disk 90 to rotate through one sheet inverting cycle. Sheet inverter disk 90 can be, for example, the inverter disk used in the Xerox 9500 disk/inverter/stacker, and thus no further discussion is warranted. For additional background material relating to disk stackers, see, for example, U.S. Pat. Nos.: 4,431,171 to Jack Beery et al; 4,385,756 to Jack Beery; and 5,058,880 to McGraw et al, the disclosures of which are incorporated herein by reference. After being stripped from inverter disk 90 by stripper wall 91, the folded oversize sheets are acquired onto vacuum transport 96 and then conveyed to vacuum transport 102.

Figure 3A:
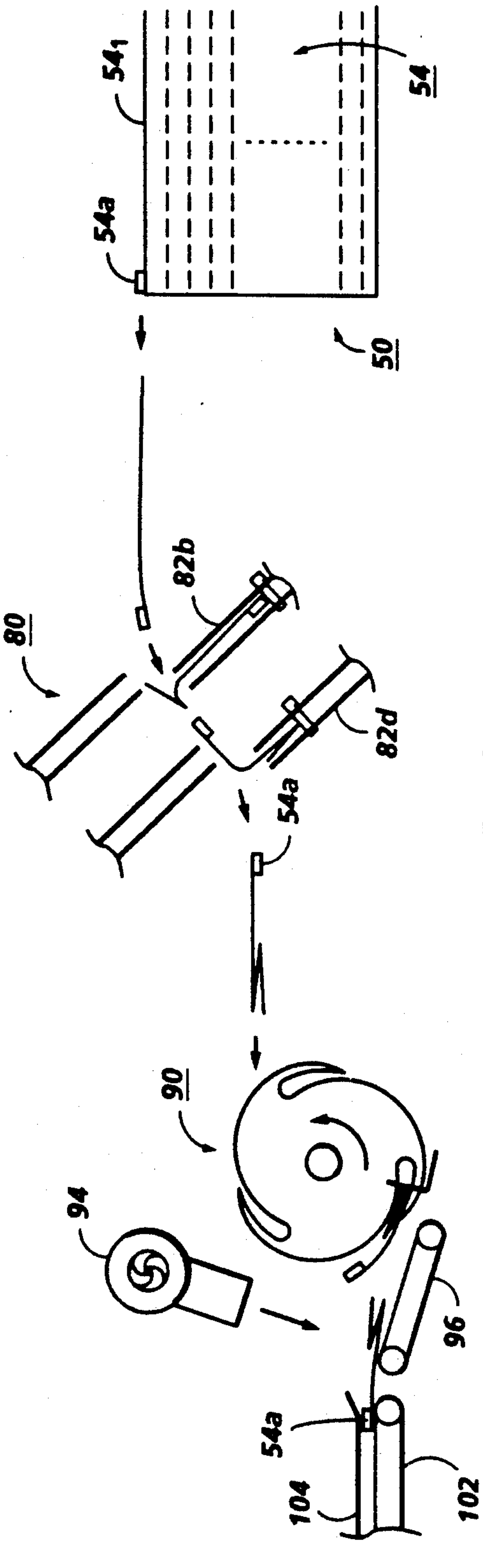
FIG. 3A shows the motion path of an oversize sheet from an insert sheet feeder unit, through a folder performing a Z-folding operation and a sheet inverter, to a common sheet path in the FIG. 2 document integrater.
Figure 3B:
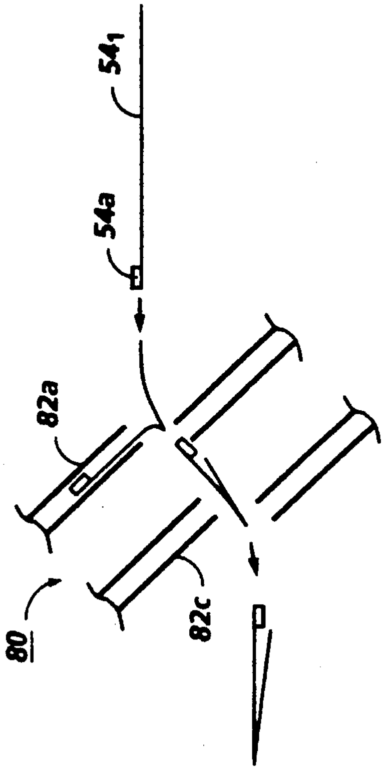
FIG. 3B shows the motion path of an oversize insert sheet through a sheet folder performing a C-folding operation.

FIG. 3A illustrates the position of an oversize sheet as it is conveyed from oversize sheet feeder unit 50 to common sheet conveyor 102. As illustrated in FIG. 3A, machine readable indicia 54a is provided on the upwardly facing, leading edge of each oversize sheet in stack 54. After exiting oversize sheet feeder unit 50, the oversize sheet $54_1$ is Z-folded in sheet folder 80. Specifically, the oversize sheet is Z-folded by insertion into folding plate 82b and folding plate 82d as illustrated in FIG. 3A. FIG. 3B illustrates the path through sheet folder 80 required to place a C-fold in oversize sheet $54_1$. Specifically, the oversize sheet is inserted into only one of the folding plates 82a or 82c.

The folded oversize sheet exits the sheet folder 80 with its folded edge as the leading edge, and the machine readable indicia 54a facing downward at its trailing edge. Accordingly, in order to properly orient the oversize sheet for final inversion prior to stacking, the folded oversized sheet is inverted using sheet inverter disk 90, as illustrated in FIG. 3A. In this manner, the oversize sheet is placed in the stack correctly with bound edge and side one as required. Although vacuum transport 96 holds the inverted sheet thereon, the folded portion of the sheet tends to unfold when it is released from sheet inverter disk 90 and conveyed by vacuum transports 96 and 102 (moved to the left in FIG. 3A). Accordingly, blower 94 is provided for blowing a stream of air onto the inverted folded oversize sheet so as to prevent the sheet from unfolding. Once the folded portion of the oversize sheet 54 reaches vacuum transport 102, a guiding plate 104 maintains the sheet in its folded state.

The blower thus permits folded sheets to be inverted and conveyed toward a more restrictive sheet path (defined by vacuum transport 102 and guide 104) without unfolding. When regular sheets are placed onto vacuum transport 96 from, for example, ball-on-belt transport 72, the air stream from blower 94 is switched off to prevent the leading edge of the regular sheets from being lifted off vacuum transport 96. Accordingly, blower 94 includes a motor and a solenoid for switching the air stream on and off.

Referring to FIG. 2, vacuum transport 102 is rotated by motor M-11 to move the collated document stream (which now includes insert sheets and regular sheets), toward stacker tray 114. A hole puncher 106 can be provided along a common sheet path defined by vacuum transport 102. Hole punchers are well known in the art. The hole puncher 106 can include, for example: a registration solenoid for temporarily stopping and aligning a sheet along vacuum transport 102; a hole punch for cutting three holes in a registered sheet; a compressor for creating a compressed air force used to drive the hole punch; and a solenoid for releasing the hole punch to cause the holes to be cut through a sheet.

Figure 3C:
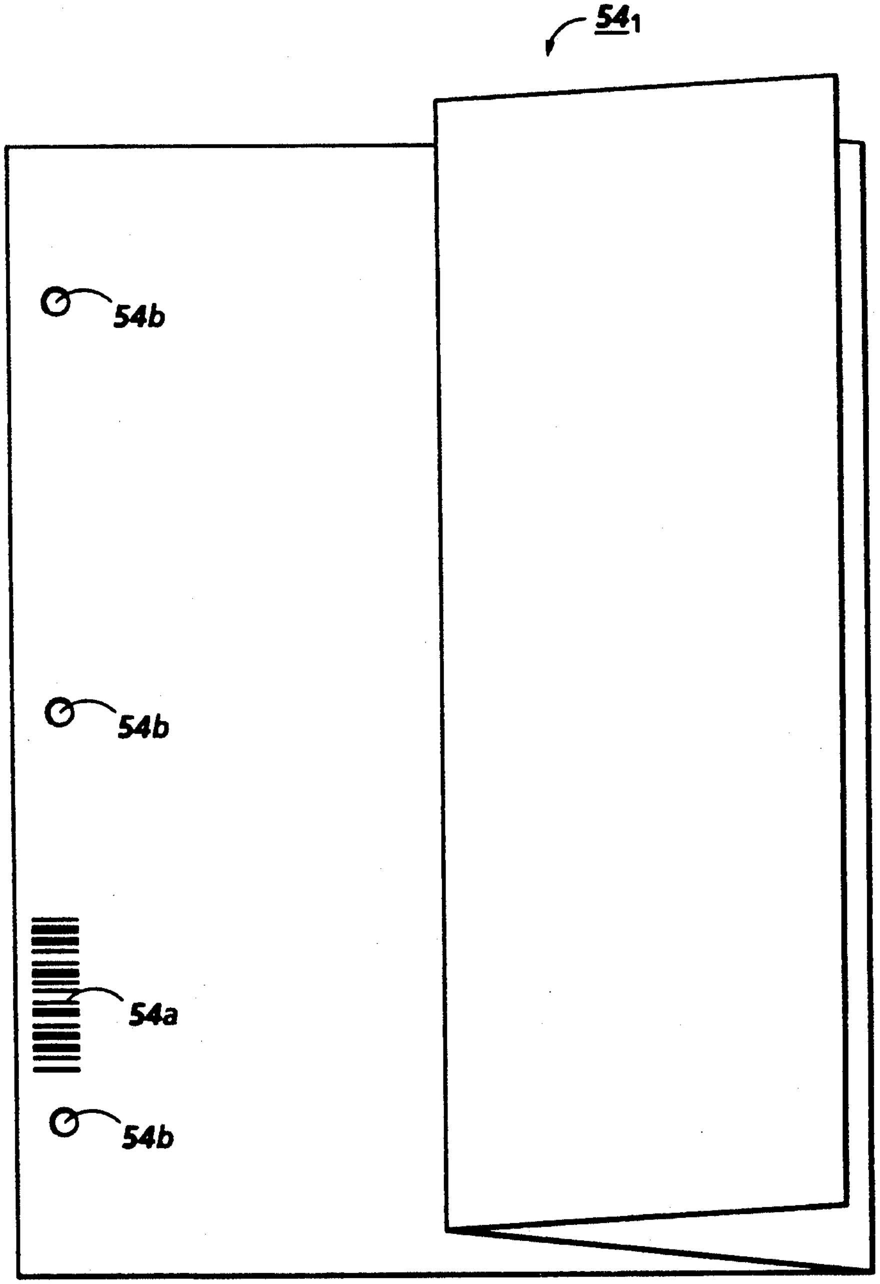
FIG. 3C is a perspective view of a Z-folded sheet in the folded state, and illustrates the location of punched holes and machine readable indicia along the bound portion of the sheet.

FIG. 3C illustrates the location of three holes 54b formed by hole puncher 106, as well as the machine readable indica 54a in the form of a bar code on Z-folded sheet $54_1$.

After having the holes punched therein, the sheets can be conveyed past a third scanner 108, which can be used to perform a page integrity check (to be described below) and then placed into stacker 114. Another sheet inverter disk 112 is provided for inverting the sheets prior to placement into sheet stacker 114. The sheet inverter disk 112 is driven by a motor M-12 and can be similar to the sheet inverter disk 90. Sheet stacker 114 includes an elevator tray 116 for holding a stack 118 of complete collated documents. Elevator tray 116 is movable up or down by motor M-13. The sheet stacker 114 can correspond to the high capacity stacker tray utilized in the Xerox 9500 disk/inverter/stacker.

Figure 4:
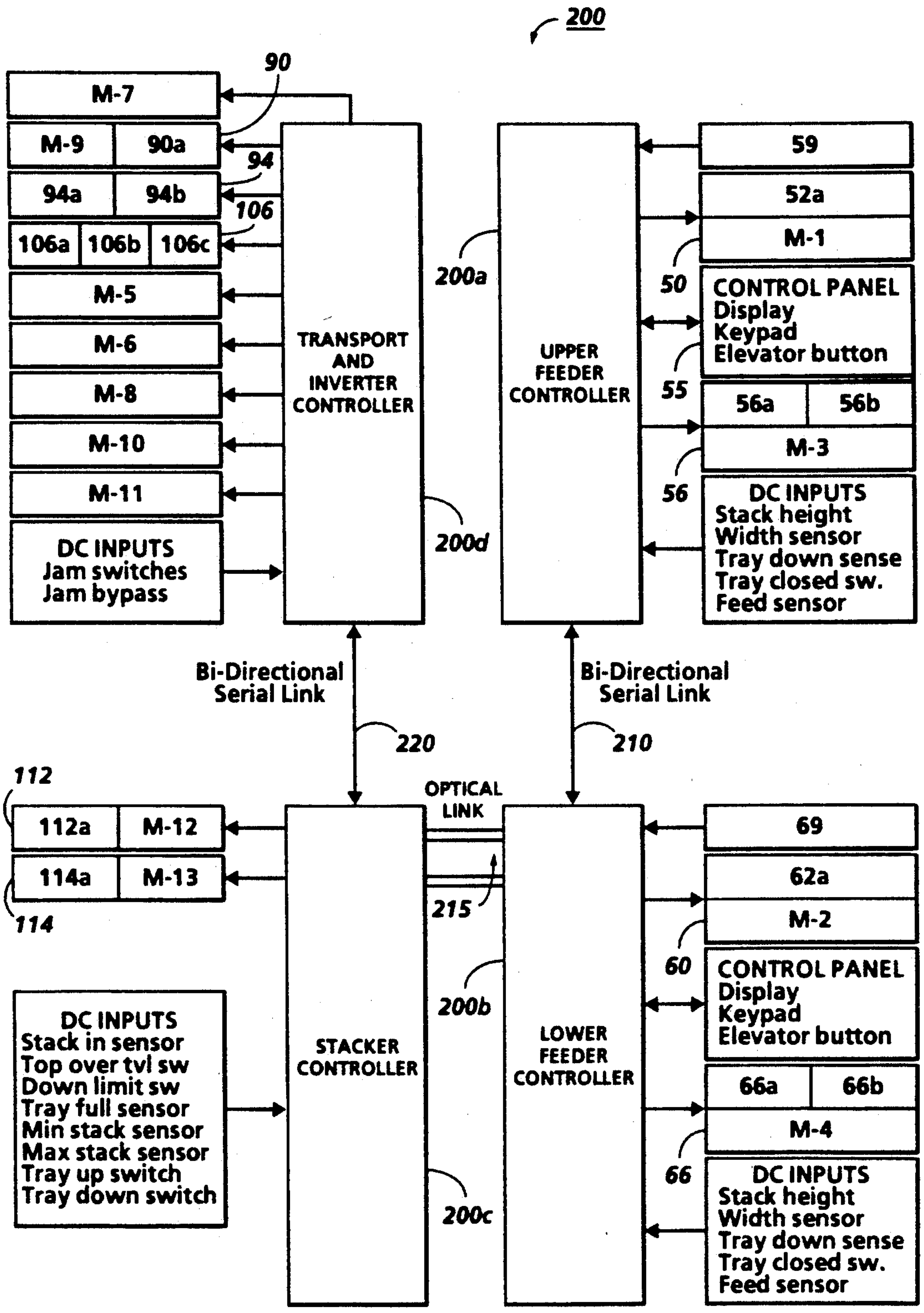
FIG. 4 is a block diagram of the control system for the document integrater of FIG. 2.

FIG. 4 illustrates a control system (or controller) 200 for controlling the document integrater 30 of FIG. 2. According to a preferred embodiment, which lends itself to modularity, four separate controllers 200a-200d (each including a central processing unit, ROM, RAM, and I/O (input-output) drivers) are provided for controlling the document integrater. Controller 200a controls the upper feeder (oversize insert sheet feeder unit 50), and is identical to controller 200b which controls the lower feeder (regular sheet feeder unit 60). Controllers 200a and 200b communicate with one another via a bi-directional serial link 210. A stacker controller 200c controls the stacker module 110. The stacker controller 200c and lower feeder controller 200b communicate with one another via an optical link 215. The optical link 215 is not susceptible to the electromagnetic interference from switching noise of the electromechanical devices in the apparatus. A transport and inverter controller 200d controls the components of the folder module 70 and punch module 100. The transport and inverter controller 200d communicates with the stacker controller 200c via a bi-directional serial link 220. The use of four controllers as set forth above permits the feeder units 50 or 60 as well as the stacker module 110 to be used separately from the document integrater without requiring excessive software adjustments or set-up time. Accordingly, the described control system promotes modularity.

It is understood that a single controller could be used to control the entire device. Alternatively, separate "slave" controllers could be provided for each component, with one master controller being used to control the "slave" controllers.

Upper feeder controller 200a receives input from sheet scanner 59 relating to the machine readable indicia provided on an insert sheet in sheet feeder unit 50 which is to be fed from stack 54. Upper feeder controller 200a also receives input information in the form of DC signals from: a) a stack height sensor indicative of the height of stack 54 on elevator 52; b) a width sensor indicative of the width of sheets in stack 54; c) a tray down sensor indicating whether elevator tray 52 is in its lowermost position; d) a tray-closed-switch indicating whether tray 52 is located in its operative position fully inside of feeder module 40; and e) a feed sensor which indicates whether a sheet has been properly fed by feeder belt 56. The information of the stack height sensor is used to control motor M-1 to maintain the top of stack 54 at the proper location. The width sensor is used to control the frequency at which sheets are fed by sheet feeder 50A (the width sensor allows the feeder to feed at different frequencies for normal vs. oversize sheets). When tray down sensor indicates that the feeder tray 52 is in its lowermost position, the solenoid which unlocks elevator tray 52 is released so that tray 52 can be pulled out of feeder module 40 (to the right in FIG. 2). The tray-closed-switch indicates whether elevator tray 52 has been returned to its operative position (to the left in FIG. 2) fully inside of feeder module 40. The feed sensor is used as a jam detector for identifying when a sheet has not been properly fed by feeder belt 56.

A control panel 55 is also provided for feeder unit 50. Control panel 55 includes a display, a keypad including a START button and a STOP button, and an elevator button. The elevator button is actuated to cause elevator tray 52 to move to its lowermost position so that insert sheets can be added or removed. The display can be used to inform the operator of any malfunctions which may occur or, for example, the number of copies which have been made thus far. The keypad can be used to input the number of oversize sheets in the document for purposes of integrity checking. Upper feeder controller 200a does not need to know the number of insert sheets in the document since the feeding of sheets is totally controlled by the machine readable indicia provided on the sheets. However, by inputting the number of insert sheets in the document via the keypad, the controller 200a can count the number of sheets fed for each copy of the document, and compare this count to the number input on the keypad for purposes of integrity checking. The keypad also includes a START button and a STOP button for selectively starting or stopping a feeding operation. The START button is used to indicate which feeder unit (50 or 60) is to feed the first sheet in a document integrating procedure. The START button also is used to restart the feeding operation when it has been stopped due to a paper jam, or some other malfunction.

Upper feeder controller 200a controls sheet feeder unit 50 by controlling motor M-1 (based upon information provided by the stack height sensor or the elevator button). Upper feeder controller 200a also controls the solenoid 52a for releasing tray 52 from its operative position. Upper feeder controller 200a further controls the sheet feeder 50A by controlling: motor M-3; a blower for creating the air knife and for applying vacuum through feeder belt 56; and a clutch 56b for permitting belt 56 to rotate through one sheet feeding cycle.

The lower feeder controller 200b operates in a manner identical to upper feeder controller 200a, and has corresponding inputs and outputs.

Stacker controller 200c controls the output stacker disk 112 and the stacker elevator 114. Stacker controller 200c receives input information in the form of DC signals from: a) a stack-in-sensor to inform stacker of a sheet entering its domain for jam timing and inverter timing; b) a top-overtravel-switch which prevents elevator tray 116 from moving by an excessive amount in the upward direction; c) a down-limit-switch which prevents elevator tray 116 from being moved excessively in the downward direction; d) a tray-full-sensor which senses when tray 116 is almost full—this permits document integrater 30 to perform a "soft" shutdown; e) a minimum-stack-sensor and a maximum-stack-sensor for maintaining the top of stack 118 within certain limits of sheet inverter disk 112; f) a tray-up-switch and a tray-down-switch, which are actuated by an operator to cause the elevator tray 116 to move in either the upward or downward directions to ease unloading of sheets from the tray. Stacker controller 200c controls sheet inverter disk 112 by controlling motor M-12 and a sheet inverter clutch 112a. Stacker controller 200c also controls the stacker 114 by controlling motor M-13 and a motor direction relay 114a to control the direction in which elevator tray 116 is moved by motor M-13.

Inverters 90 and 112 include sheet sensors (not shown) located a predetermined distance upstream thereof which sense a sheet moving toward the respective sheet inverter. Since the speed of the sheet is known, the inverter 90 or 112 can be actuated at the appropriate time for properly inverting the sheet. This manner of inverter actuation is well known in the art.

Output disk inverter 112 can also include an offset mechanism, actuated after the last sheet in each document copy is removed from disk 112, for offsetting each copy of the output collated document in stack 118 from surrounding copies. The offset works by pushing each sheet sideways, while the sheet is still in the inverter mechanism. Offset is performed on every sheet in alternate books (document copies). See, for example, the above incorporated U.S. Pat. No. 4,431,177 to Beery et al for one example of a disk inverter which performs offsetting. Knowledge that a sheet is the last sheet in a copy of the document can be provided by counting the sheets fed from feeder units 50, 60 (when the number of sheets in each copy is input by the operator), or from a "last-sheet-in-document" code provided in the machine readable indicia of the last sheet.

Transport and inverter controller 200d controls the components contained in the folder module 70 and punch module 100. The operations performed by controller 200d can vary depending upon the use of the document integrater. Controller 200d controls the motors and does jam timing for the paper path. If a jam occurs here, controller 200d sends a signal to the feeder units via the stacker controller to cause a shutdown. In the illustrated embodiment, controller 200d controls the various components associated with folder module 70 and punch module 100 in a conventional manner based upon sheet-actuated sensors well known in the art. Accordingly, only brief discussion of the components controlled by controller 200d is provided. Controller 200d controls: the various sheet transport motors M-5, M-6, M-8, M-10 and M-11; folder motor M-7; inverter disk 90 by controlling motor M-9 and an inverter clutch 90a; blower 94 by controlling a blower motor 94a and a blower solenoid 94b (for switching motor 90a ON and OFF); and hole puncher 106 by controlling a compressor 106a, a punch solenoid 106b, and a registration solenoid 106c. Controller 200d also receives inputs in the form of DC signals from jam switches and a jam bypass. Eight jam switches J1-J8 (see FIG. 2) are provided. The jam bypass allows the multi-function document integrater to be operated disregarding jam switches to aid in diagnostics (a well known technique).

The sheet transport motors are operated at speeds appropriate for maintaining the sequence of sheets conveyed thereon. Additionally, sheet sensors can be provided at the inlet of the sheet inverter 90 and of the folder 80 so that the flow of sheets through these devices can be precisely controlled. The control functions of the present invention which are believed to be novel and unobvious relate to the manner in which feeder units 50 and 60 are actuated based upon machine readable information provided on the document sheets which are transported from the sheet feeder units 50, 60. Accordingly, a more detailed description of the sheet feeder control is now provided.

Figure 5:
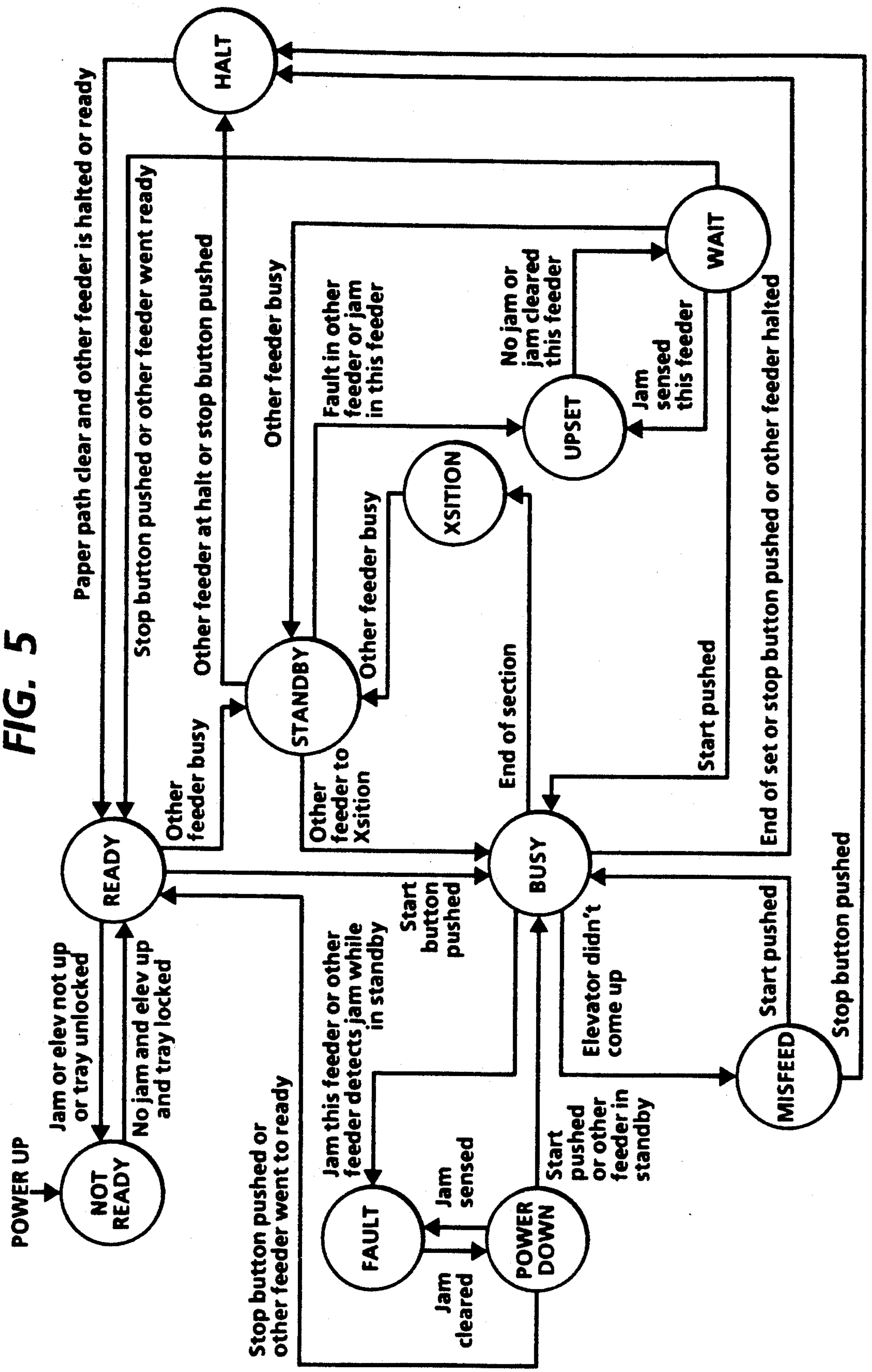
FIG. 5 is a state diagram for the sheet feeder units of the FIG. 2 document integrater.

FIG. 5 is a state diagram which illustrates the various states in which each sheet feeder unit can cycle. Assuming no paper jams or other malfunctions occur, each sheet feeder unit cycles through four states: a) a READY state where all of the sheet feeder units (in the FIG. 2 example, this is units 50 and 60) are ready to begin feeding sheets; b) a BUSY state in which a sheet feeder unit is in the process of feeding sheets; c) a TRANSITION state (Xsition) where a scanner of a sheet feeder unit has read machine readable information indicative of the end of a section of documents fed from that sheet feeder unit, and thus indicative of the need to switch feeding to another sheet feeder unit; and d) a STANDBY state when another feeder unit is busy feeding sheets. With reference to FIG. 5, the states through which a single sheet feeder unit can cycle will now be described. The state diagram of FIG. 5 applies to a single sheet feeder unit used in the document integrater of the present invention. Each sheet feeder unit cycles through the same choice of states illustrated in FIG. 5. It will be seen that a feeder unit's state depends on the function being performed by that feeder unit, as well as the state of other feeder units.

Upon initial power-up, a sheet feeder unit remains in a NOT READY state until: no jams are detected; the top of the stack of sheets on its elevator tray is located at the proper upward position (below the endless feeder belt 56, 66); and the feeder elevator tray (52, 62) is in the locked position. When the above three conditions are met, the feeder unit cycles to the READY state. The feeder unit remains in the READY state until all other feeder units are also in their READY state. Assuming the described feeder unit is the feeder unit which is to feed the first sheet of a document, an operator then pushes a START button on the control panel of that feeder unit to initiate a document integrating procedure. Actuation of the START button is the only user provided information which is required by the document integrater of the present invention. Of course, the START signal could be electronically provided.

When the START button is pushed, that feeder unit cycles to the BUSY state and begins feeding sheets from the top of the stack contained therein. The opposite feeder unit cycles to the STANDBY state, such that it will be ready to go to the BUSY state and begin feeding when so commanded. As each sheet is fed from the stack, it is scanned for machine readable information thereon indicative of the need to switch to another sheet feeder unit. If only two sheet feeder units are provided (as illustrated in FIG. 2) the only information necessary is that the feeding be switched to the other sheet feeder unit. If more than two sheet feeder units are provided, then additional information indicating the sheet feeder unit to which the feeding is to be switched also needs to be provided as machine readable information on the sheets. In the present embodiment, the machine readable information is not read until after a sheet has been fed from a top of a stack (54 or 64). Accordingly, in the present embodiment, when it is necessary to switch sheet feeder units, the machine readable information provided on one sheet indicates that the next sheet should be fed from another sheet feeder unit (for example, if sheet 3 is the last regular sheet prior to the insertion of an oversize sheet, sheet 3 would contain machine readable information indicative of the need to switch to the oversize sheet feeder unit 50 for feeding the next sheet (sheet 4)). After this last sheet in a collated section of sheets is fed, the sheet feeder unit cycles into a TRANSITION state, and then to the STANDBY state. At the same time, a signal is sent to the appropriate other sheet feeder unit that it should begin feeding sheets. Once the other sheet feeder unit becomes BUSY, the previously activated sheet feeder unit cycles into a STANDBY state.

In the FIG. 2 example, where only two sheet feeder units are provided, a sheet feeder switches from the STANDBY state to the BUSY state when it detects that the other feeder unit has gone from the BUSY to the TRANSITION state.

The transition of the other feeder unit from the BUSY state to the STANDBY state is interpreted by the feeder unit already in the STANDBY state as a signal indicating that it should begin feeding sheets. Accordingly, the sheet feeder unit cycles back into the BUSY state when the other sheet feeder unit goes to TRANSITION.

Malfunctions which can occur when a feeder unit is in the BUSY state will now be described. If an active (BUSY) feeder unit experiences a paper jam or the other feeder unit detects a paper jam while the other feeder is in STANDBY, the BUSY feeder unit enters the FAULT state. The feeder unit remains in the FAULT state until the jam is cleared. Upon clearance of the jam, the feeder unit enters the POWER-DOWN state. If the START button for a feeder unit is pushed when it is in the POWER-DOWN state, or the other feeder unit switches to STANDBY when the present feeder unit is in the POWER-DOWN state, the present feeder unit then recycles back to the BUSY state. Alternatively, if the STOP button of the feeder unit is pushed or the other feeder unit goes to the READY state when the present feeder unit is in the POWER-DOWN state, the present feeder unit cycles to the READY state.

If a feeder unit is in the BUSY state and the top of the stack contained on its elevator tray is not sensed, the feeder unit enters the MISFEED state. This can happen when, for example, the supply of sheets in a feeder unit runs low. The feeder unit remains in the MISFEED state until the START button is pushed to return the feeder unit to the BUSY state or a STOP button is pushed which causes the feeder unit to enter the HALT state. The feeder unit remains in the HALT state until its paper path is cleared and the other feeder unit enters its HALT state or its READY state. Then, the feeder unit returns to the READY state.

If the scanner of a BUSY feeder unit reads machine readable indicia from a sheet which indicates that the entire set (i.e., the entire job) is finished, the feeder unit then enters the HALT state. The feeder unit can also enter the HALT state if the STOP button is pushed or the other feeder unit enters the HALT state while the present feeder unit is in the BUSY state. As stated above, a feeder unit cycles from the HALT state to the READY state when its paper path is clear and the other feeder unit enters the HALT state or READY state.

Malfunctions can also occur when a feeder unit is in the STANDBY state. If the STOP button is pushed or the other feeder unit enters the HALT state when a feeder unit is in the STANDBY state, that feeder unit cycles to the HALT state. Alternatively, if the other feeder unit enters the FAULT state or a jam occurs in the present feeder unit while it is in the STANDBY state, the feeder unit enters the UPSET state. If a fault occurred in the other feeder unit, the present feeder unit cycles into the WAIT state and remains there until the other feeder unit returns to the BUSY state (which returns the present feeder to the STANDBY state), or until the other feeder unit cycles to the READY state or the STOP button is pushed (which causes the present feeder unit to cycle to the READY state). If a jam occurs in a feeder unit while it is in the STANDBY state, the feeder unit remains in the UPSET state until the jam is cleared. Upon clearance of the jam, the feeder unit cycles to the WAIT state, and remains there until the appropriate actions occur causing it to cycle to the STANDBY or READY states as described above.

Figure 6A:
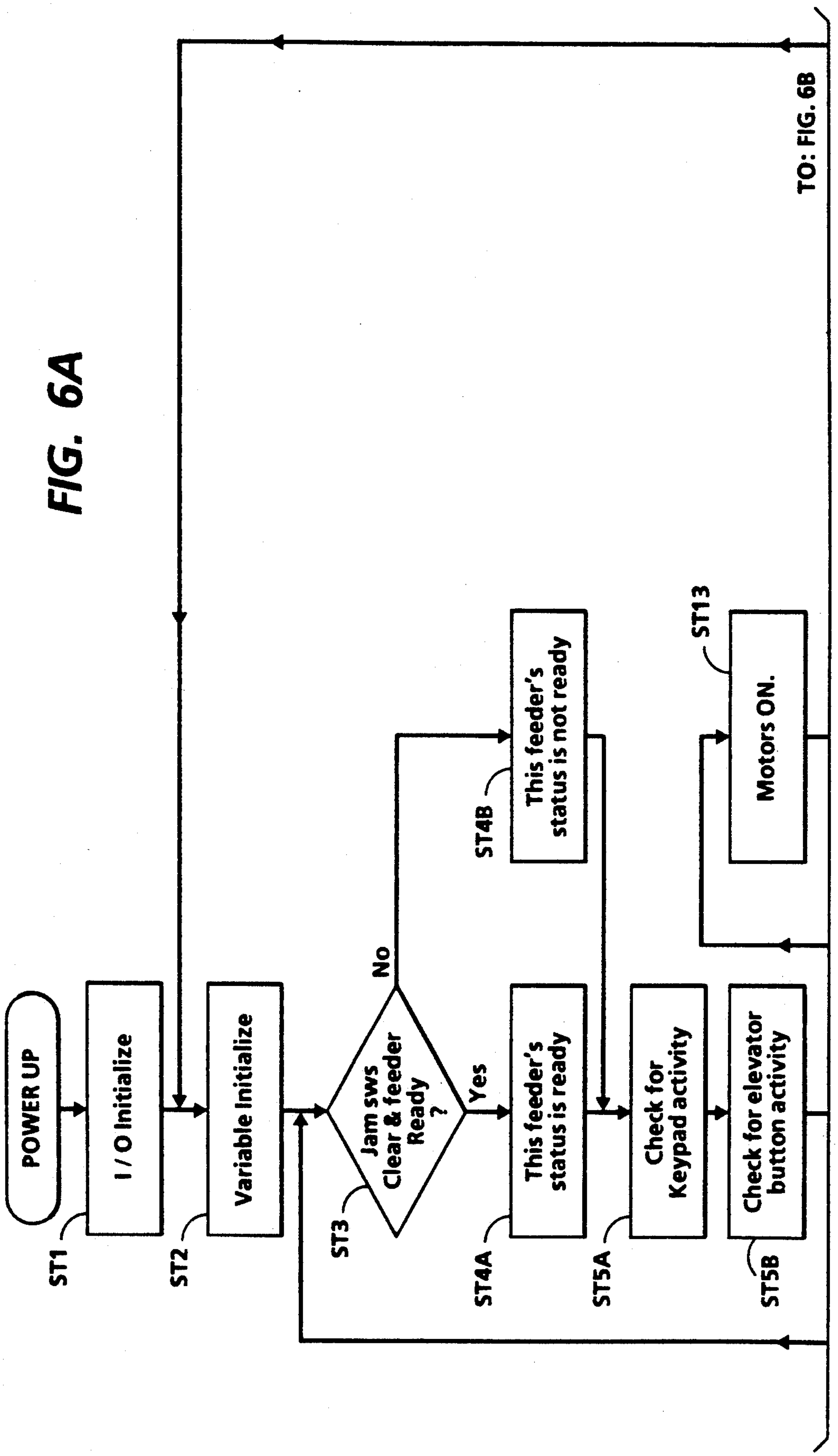
FIGS. 6A–C are a flowchart illustrating a procedure for controlling each sheet feeder unit of the FIG. 2 document integrater.
Figure 6B:
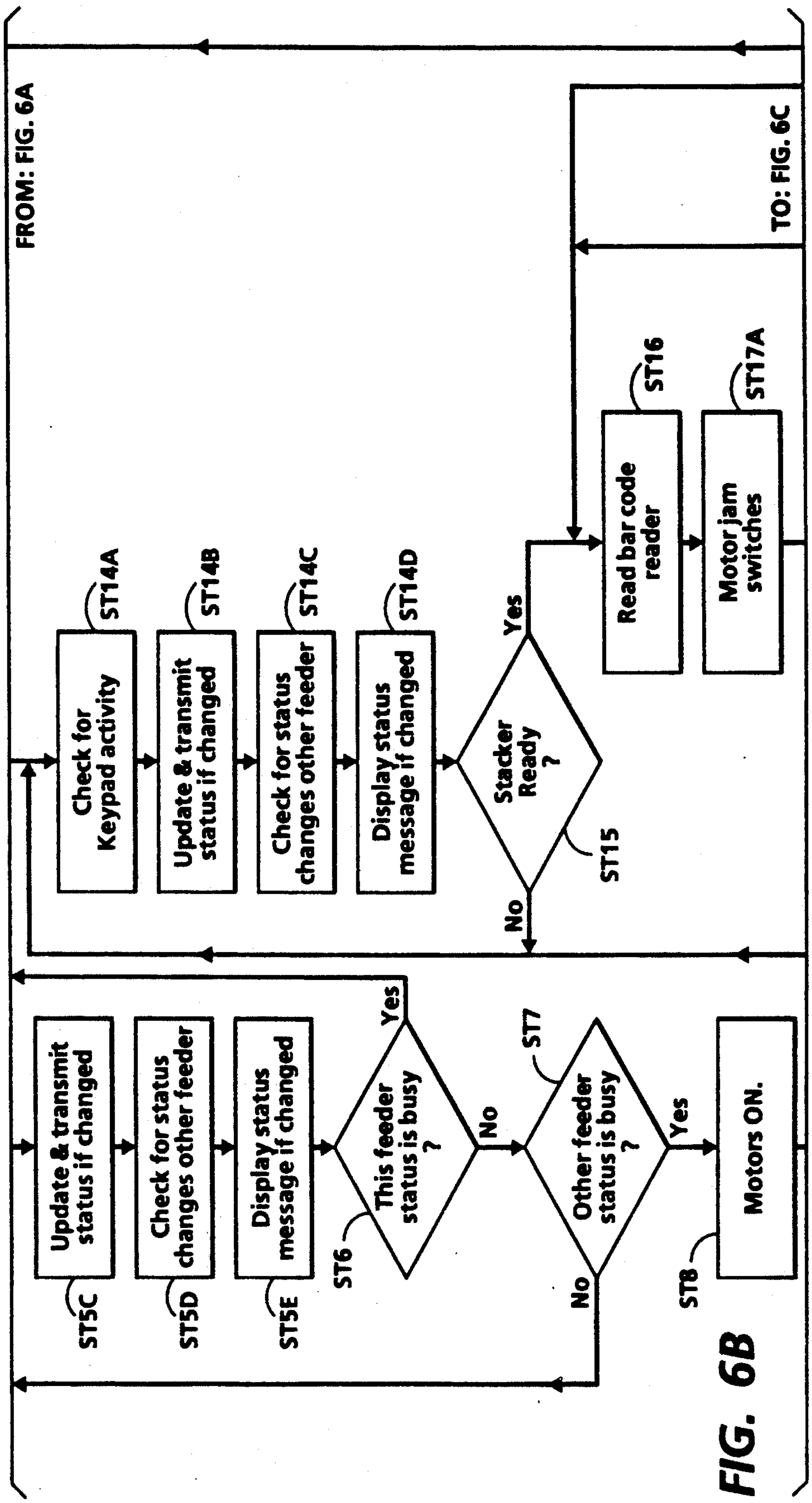
Figure 6C:
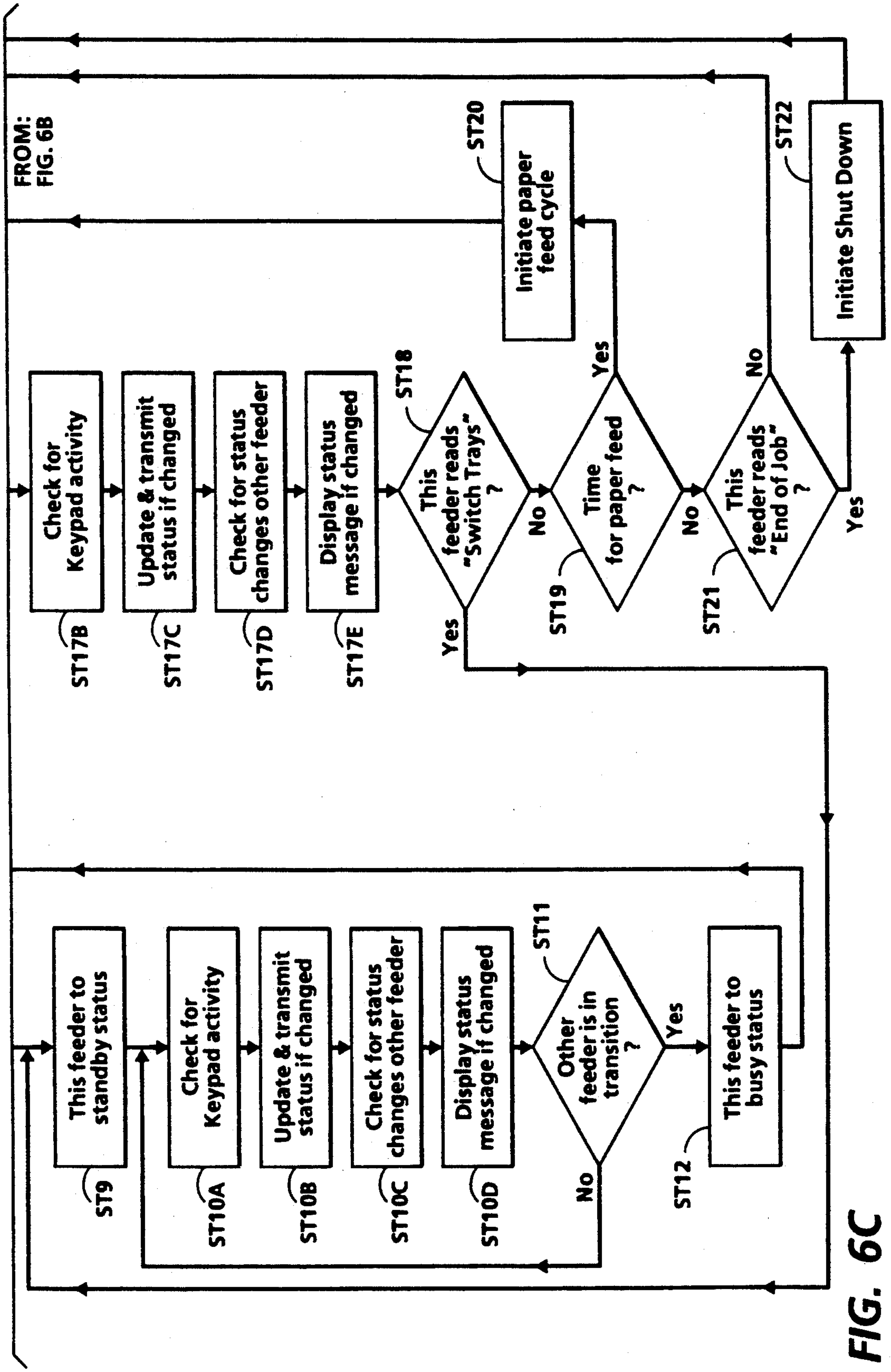

FIGS. 6A-C, are a flowchart for use by controllers 200*a* and 200*b* in controlling sheet feeder units 50 and 60. After powering up document integrater 30, input/output initialization takes place in step 1, ST1, (hereafter, all steps are referred to by the abbreviation ST). In ST1, I/O ports are set up as inputs or outputs, serial communications are established between the feeder units, and the display is cleared. Internal registers controlling interrupts and timers are set to their proper value, and all electro-mechanical devices are turned off. In ST2, variable initialization takes place. In ST2, program variables such as the number of sheets in the paper path and the number of sheets fed are cleared. All software timers are set to zero. In ST3, determinations are made as to whether all jam switches are clear and the feeder unit is READY. If the result of ST3 is NO, the feeder unit remains in the NOT READY state in ST4B. If the result of ST3 is YES, the feeder unit status is changed to READY in ST4A. In ST5A-E, inputs from the feeder unit's keypad and elevator button are monitored. Additionally, the status of the other feeder unit(s) are monitored. Based on this input information, the status of the present feeder unit is updated and transmitted to the other feeder unit if the status has changed. Additionally, the status of the feeder unit is displayed on the control panel if a change has occurred. In ST6, a determination is made as to whether this feeder unit is BUSY. If the feeder unit is not BUSY, a determination is made in ST7 as to whether the other feeder unit is BUSY. If neither feeder unit is BUSY, flow returns to ST3, where the feeder unit remains in the READY state (or possibly changes to the NOT READY state) until it or the other feeder unit becomes BUSY.

If the result of ST7 is YES, the other feeder unit is BUSY. Accordingly, the motors in the present feeder unit are turned ON in ST8, and the status of the present feeder unit changes to STANDBY in ST9. When in the STANDBY state, keypad activity of the present feeder unit and the status of the other feeder unit are monitored in ST10A and ST10C. Any changes in the state of the present feeder unit are made in ST10B, and the results displayed in ST10D. The present feeder unit continuously monitors itself and the status of the other feeder unit until the transition state of the other feeder unit is detected in ST11. When the other feeder unit is detected to be in the TRANSITION state, the state of the present feeder unit changes to BUSY in ST12. Flow then proceeds to ST14A.

If the present feeder unit is placed in the BUSY state after initialization of the document integrater 30 (i.e., the result of ST6 is YES), flow proceeds to ST13 where the motors of the present feeder unit are turned ON. Flow then proceeds to ST14A. When in the BUSY state, keypad activity and the status of the other feeder unit are monitored in ST14A and ST14C, respectively. Any changes in the state of the present feeder unit are made in ST14B and displayed on the control panel in ST14D. If the status of the present feeder unit remains BUSY, a determination is made in ST15 as to whether the output stacker 112 is READY. (If the stacker tray is left down after unloading the previous job, pushing start on the feeder unit will put the feeder unit in a BUSY state, but will delay feeding until the stacker tray is elevated to the proper level. Meanwhile, when the stacker gets a message from the feeder unit that the feeder unit is READY to feed, the stacker automatically adjusts the stacker tray to the proper level. When this is accomplished, the stacker messages the feeder unit that it is READY.) If the stacker is not READY, the feeder unit loops through ST14A-D until the stacker is determined to be READY in ST15.

When the stacker is determined to be READY in ST15, a top sheet in the stack of that feeder unit is fed. (Sheet feeding is actually initiated at ST20. There are only a few microseconds between ST15 and ST20.) After a sheet is fed, the machine readable indicia on that sheet is read in ST16. Any paper jams are monitored in ST17A, keypad activity is monitored in ST17B, and the status changes in the other feeder unit are monitored in ST17D. Any changes to the status of the present feeder unit are made in ST17C and displayed on the control panel in ST17E. If the fed sheet contains the bar code for switching trays, the present feeder unit changes to the STANDBY state in ST9. If the switch tray bar code is not on the fed sheet, flow proceeds to ST19. In ST19 a determination is made as to whether it is time to feed another sheet. This determination is made based upon the value of a software timer (conventional). A software timer is started at the beginning of each feed cycle. At a timer value determined by the sheet size, another feed may be begun. If the result of ST19 is YES, a conventional paper feed cycle is initiated in ST20, and then flow returns to ST16. If it is not time to feed another sheet, flow proceeds to ST21 where a determination is made as to whether the last sheet read by the bar code reader contained the end-of-job bar code. If the end of job bar code was contained on the previously fed sheet, system shut down is initiated in ST22, and then flow returns to ST2. If the end-of-job bar codes was not read, flow proceeds to ST16.

Integrity checking options can also be included in the document integrater 30. For example, every sheet in the document can also include a bar code indicative of the page number of that sheet. A common sheet path bar code reader 108 can be provided along the common sheet path (for example, along vacuum transports 96 or 102). The bar code reader 108 reads the bar code indicative of page number from each sheet as it is fed along the common sheet path. If the sheets are determined to be out of order, a soft shut down of the document integrater could be performed, and an appropriate error signal provided. It would be necessary for an operator to input the total number of sheets in the document into the controller 200 so that feeding of the first sheet of a document immediately after the last sheet of a previous copy of the document past scanner 108 was not detected to be an error. Thus, machine readable information relating to page order can be provided on each sheet. This machine readable information is then scanned by an integrity scanner 108 located along a common sheet path.

In the present example, the sheet folder 80 is set up to perform a sheet folding operation based upon a predetermined user input instruction. For example, the user can change the operation to be performed by sheet folder 80 between: Z-folding a sheet; C-folding a sheet; or permitting a sheet to pass through sheet folder 80 without being folded (bypass mode). The sheet paths for Z-folding a sheet and for C-folding a sheet are described above with reference to FIGS. 3A and 3B. Typically an 11×17" sheet is Z-folded, while an 11×16" sheet is C-folded The sheet folder 80 would be bypassed when the insert sheets in stack 54 are, for example, $8\frac{1}{2}\times11''$ sheets.

It is also possible to provide machine readable information on the insert sheets in stack 54 which indicates an action to be performed by sheet folder 80. This machine readable folding information would then be used by the controller which controls sheet folder 80 (in the current example, controller 200d) so that sheet folder 80 performs the appropriate folding operation. The folding information provided on a sheet could, for example, direct the sheet folder 80 to either: Z-fold a sheet; C-fold a sheet; or not fold a sheet. When the sheet folder 80 is operated in this manner, different types of insert sheets can be located in the same insert sheet feeder unit. This reduces the number of feeder units required in document integrater 30.

Figure 7:
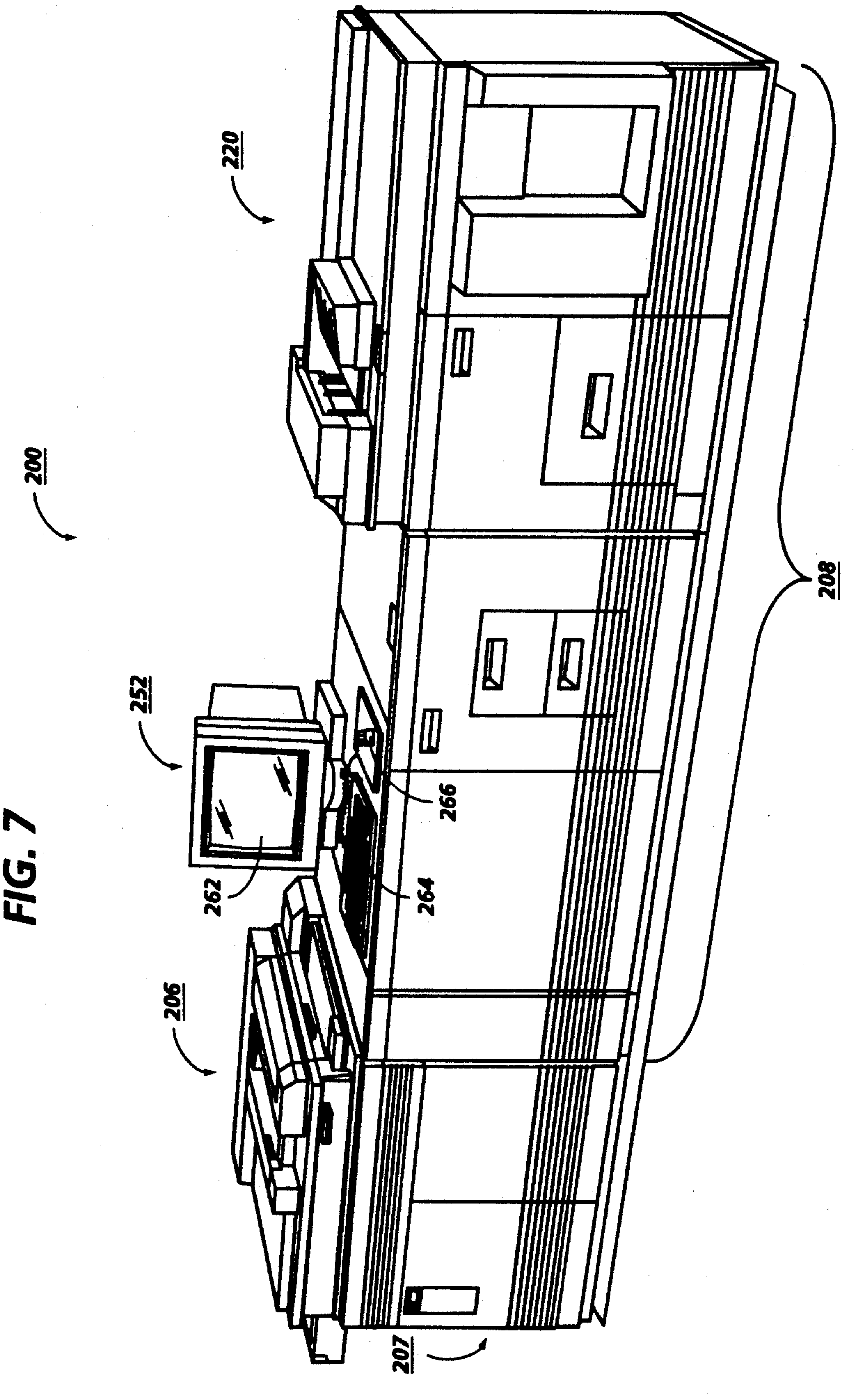
FIG. 7 is a perspective view of a printing system capable of printing collated partial sets of a document, and capable of incorporating machine readable indicia on these sheets.

In order to produce the plurality of collated partial sets of a document, the imaging device 200 illustrated in FIG. 7 could be used to place bar codes on sheets of the document electronically stored in a memory. As an alternative, previously coded bar code labels could be placed on the appropriate sheets of a document prior to making multiple copies of the document. In the currently described example, where a 100 page document containing predominantly $8\frac{1}{2}\times11''$ sheets with Z-folded insert sheets as pages 20, 33–35, 40, 70–75 and 91, the insert and regular sheets located at the end of a section of the document containing a continuous collated sequence of sheets would be printed with a bar code indicating that a sheet feeding operation should be switched. Thus, the regular sheets having a bar code would at least be the sheets containing pages 19, 32, 39, 69, and 90. The oversize insert sheets having a bar code indicative of the need to switch a feeding operation would at least be the sheets corresponding to pages 20, 35, 40, 75 and 91. Since the last sheet in the document (page 100) is printed on the same type of sheet (regular size) as the first sheet in the document (page 1), no switching instruction is required after the feeding of sheet 100. The regular sheet feeder unit 60 would merely feed sheet 1 in the next copy of the document immediately after feeding sheet 100 of the previous copy. If a switch between sheet feeder units is required at the end of a document, the last page in the document would be appropriately coded to cause a switch between sheet feeder units to occur.

The imaging device creating the multiple collated partial sets of the document could be any conventional copier. FIG. 7 illustrates the Xerox DOCUTECH printing system, which could be used to incorporate bar codes onto electronically stored page images. The incorporation of bar codes onto sheets (electronically stored sheets or sheets being imaged by conventional light-imaging processes) is conventional. See, for example, U.S. Pat. Nos. 4,970,554 to John L. Rourke and 4,757,348 to John L. Rourke et al, both of which are assigned to the same assignee as the present application; and U.S. Pat. No. 4,987,447 to Ojha. Accordingly, the disclosures of U.S. Pat. Nos. 4,970,554; 4,757,348; and 4,987,447 are incorporated herein by reference. The copier 200 includes a scanner section 206, controller section 207 and printer section 208. The DOCUTECH printing system also includes a user interface (UI) 252 which includes a combined operator controller/CRT display consisting of an interactive touch screen 262, keyboard 264 and mouse 266. UI 252 would be used to control placement of bar codes on the bound edge of sheets. The copier could also include a stacker section 220 for forming the stacks of sheets to be placed in each sheet feeder unit of the document integrater 30.

The DOCUTECH printing system is a laser based printing system. However, the present invention may be used with other types of printing systems such as ink jet, ionographic, etc. The scanner section 206 could include an ADH (automatic document handler) for cycling a document over a platen one time for producing multiple collated copies of that document (in the present example, only the sheets in the document having the same size would be cycled through the ADH at one time). When the page images are previously electronically stored in memory, no ADH would be required. Collated partial sets of the document would be produced, with each collated partial set being placed in a separate sheet feeder unit of the document integrater 30. In the present example, regular sheet feeder unit 60 would be filled with a plurality of collated partial sets of the document containing the repeating sequence of pages 1–19, 21–32, 36–39, 41–69, 76–90 and 92–100. The oversize insert sheet feeder 50 would contain a plurality of collated partial sets of the oversize sheets in the document. Thus, the oversize insert sheet feeder unit 50 would include the repeating sequence of pages 20, 33–35, 40, 70–75 and 91.

Preferably, printing system 200 would be used to print plural, unseparated collated partial sets of the document including the regular sheets of the document. Each regular sheet located immediately prior to an insert sheet location in the document would be printed with machine readable indicia thereon indicative of the subsequent location in the document of an insert sheet. A collated stack of the regular sheets could be formed and then placed in regular sheet feeder unit 60. Alternatively, in order to incorporate document integrater 30 "in-line" with the printing system 200, the stream of collated regular sheets could be fed directly to the inlet attached to regular sheet feeder unit 60. Since the feeding of sheets past regular sheet scanner 69 is periodically interrupted in order to feed insert sheets from insert sheet feeder unit 50, some provision for sheet buffering upstream of the regular sheet inlet would be required so that the printing operation performed by printing system 200 would not have to be interrupted. This buffering could be accomplished, for example, with a bottom feed document handler.

Plural sets of the insert sheets of the document would also be printed and output into one or more different insert sheet feeder units. In the present example, all the oversize insert sheets are printed and output to form one collated stack of oversize sheets containing plural partial copies of the document. When incorporating the document integrater 30 "in-line" with the copier during the output of regular sheets, the oversize sheets would be printed prior to printing of the regular sheets. However, if the document integrater is operated "off-line" from the printing system, the contents of each sheet feeder unit could be independently produced at any time.

Once the insert sheets are placed into their respective sheet feeder units, an operator initiates a document integrating procedure by pressing the START button on the sheet feeder unit from which page 1 will be fed. In the present example, the START button on regular sheet feeder unit 60 is pressed so that sheets are rapidly sequentially fed from sheet feeder unit 60 through the inlet toward a final destination (stacker unit 114). The regular sheets are scanned by scanner 69 as they are fed from the inlet. Upon detection by the scanner 69 of the machine readable indicia on a regular sheet indicative of the subsequent location of an insert sheet, the feeding of regular sheets from the inlet is stopped. One or more insert sheets are then rapidly sequentially feed from insert sheet feeder unit 50. The insert sheets are also fed toward final destination 114 while scanning each insert sheet with sheet scanner 59. When sheet scanner 59 detects machine readable indicia on an insert sheet indicative of the end of an insertion operation, the feeding of insert sheets from sheet feeder unit 50 is stopped, and the rapid sequential feeding of regular sheets from sheet feeder unit 60 is resumed. If more than one insert sheet feeder units are provided, the feeding of insert sheets could switch from one insert sheet feeder unit to another. The switching of the feeding of insert sheets from insert sheet feeder units would continue until one of the insert sheets directed the controller 200 to resume feeding regular sheets from regular sheet feeder unit 60. In the present example, alternate feeding of sheets from sheet feeder units 50 and 60 would continue until a sheet is read which contains machine readable indicia thereon indicative of the end of the job. At that point, all sheet feeding would STOP and the stacker 114 would contain multiple collated complete copies of the document.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of inserting insert sheets into a collated stream of regular sheets which defines plural partial sets of a document so as to form a plurality of collated complete sets of said document, said insert sheets being supplied from two or more insert sheet feeder units containing a plurality of copies of each insert sheet in the document, at least a last regular sheet in a continuous collated section of said document in the collated stream having machine readable indicia printed thereon indicating that an insert sheet needs to be inserted into said collated stream after said last regular sheet, at least a last insert sheet in each continuous section of insert sheets to be inserted from each insert sheet feeder unit having machine readable indicia printed thereon indicating either that regular sheet feeding should resume or that a section of insert sheets from another insert sheet feeder unit should be inserted into said collated stream, said method comprising:

a) feeding said collated stream of regular sheets in order from an inlet toward a final destination while scanning said regular sheets with a regular sheet scanning device, located downstream of said inlet, capable of reading said machine readable indicia from said regular sheets;

b) stopping the feeding of regular sheets from said inlet when the machine readable indicia on a last regular sheet in a continuous section of the document in said stream is read, said last regular sheet in the continuous section of the document being fed toward said final destination, and starting to feed insert sheets from an insert sheet feeder unit indicated by said last regular sheet unless the machine readable indicia on said last regular sheet contains a machine readable STOP command in which case all sheet feeding stops;

c) stopping the feeding of insert sheets from the insert sheet feeder unit indicated in step (b) when the last insert sheet in a continuous section of insert sheets located in said insert sheet feeder unit is detected by an insert sheet scanning device located downstream of said insert feeder unit, said last insert sheet in the continuous section of insert sheets being fed toward said final destination;

d) returning to step (a) if instructed to do so by the last insert sheet fed, otherwise;

e) feeding insert sheets from another insert sheet feeder unit indicated by the last insert sheet fed, until a last insert sheet in a continuous stream of insert sheets located in said another insert sheet feeder unit is detected by another insert sheet scanning device located downstream of said another insert sheet feeder unit, said last insert sheet in the continuous stream of insert sheets being fed toward said final destination; and f) repeating step (d) unless a sheet is fed containing a machine readable STOP command in which case all sheet feeding stops.

2. The method of claim 1, wherein said regular sheets are located as a collated stack of plural partial sets of the document in a regular sheet feeder unit upstream of said inlet, and further comprising feeding said regular sheets from said regular sheet feeder unit to said inlet.

3. Apparatus for inserting insert sheets into a collated stream of regular sheets fed through an inlet so as to form a collated stack containing multiple complete sets of a document, at least some of the sheets in the document having machine readable indicia printed thereon indicative of the end of a collated continuous portion of the document contained in the stream or stack of sheets, said apparatus comprising:

a) a regular sheet feeder for feeding regular sheets from the inlet toward a final destination when activated;

b) a regular sheet scanner for reading the machine readable indicia on regular sheets fed by said regular sheet feeder;

c) one or more insert sheet feeder units, each insert sheet feeder unit including:

i) an insert sheet feeder for feeding an insert sheet from the insert sheet feeder unit toward the final destination when activated; and ii) an insert sheet scanner for reading the machine readable indicia on insert sheets to be fed from the insert sheet feeder unit;

d) control means for:

i) determining which sheet feeder should be activated based on the machine readable indicia contained on a sheet in an activated sheet feeder which is to be fed to said final destination, so as to maintain a collated complete stream of sheets from said inlet and said one or more insert sheet feeder units; and ii) for selectively activating one of the sheet feeders based on said determination, said control means simultaneously deactivating all sheet feeders except the sheet feeder to be activated; and e) means, located at the final destination, for receiving sheets output by said sheet feeders in collated order so as to receive multiple collated complete sets of the document, wherein all regular sheets and insert sheets fed from said sheet feeder units reach said final destination.

4. The apparatus of claim 3, further comprising: a regular sheet feeder unit, located upstream of said inlet, for holding said regular sheets as a stack of collated partial sets of the document.

5. The apparatus of claim 3, wherein only a single insert sheet feeder unit, a single insert sheet feeder, and a single insert sheet scanning device are provided, so that said control means alternately activates one of said regular sheet feeder and said insert sheet feeder.

6. The apparatus of claim 5, wherein said insert sheet feeder unit is sized to hold oversize sheets, larger in area than an area of said regular sheets, and further comprising:

a sheet folder, located between said insert sheet feeder unit and said means for receiving sheets, for folding oversize sheets output from said insert sheet feeder unit.

7. The apparatus of claim 6, further comprising:

a sheet inverter, located between said sheet folder and said means for receiving sheets, for inverting folded oversize sheets.

8. The apparatus of claim 7, further comprising:

a common sheet conveyor located between said sheet inverter and said means for receiving sheets, said common sheet conveyor including an endless rotating belt defining a common sheet path having a sheet inlet and a sheet outlet, said sheet inlet being in communication with a regular sheet feeding path which carries regular sheets fed from said inlet, said sheet outlet being in communication with said means for receiving sheets, said sheet inverter placing inverted folded oversize sheets onto said endless rotating belt adjacent to said sheet inlet; and a blower, located adjacent to said inserter, for directing an air stream onto said endless rotating belt to prevent folded oversize sheets from fanning-out on said endless rotating belt after being placed on said endless belt by said sheet inverter.

9. The apparatus of claim 3, further comprising:

a common sheet conveyor located upstream of said means for receiving sheets, and including an endless rotating belt defining a common sheet path having a sheet inlet in communication with said inlet and said insert sheet feeder units, and a sheet outlet in communication with said means for receiving sheets.

10. The apparatus of claim 9, further comprising:

a hole puncher located along said common sheet path for temporarily stopping and punching holes in said sheets.

11. A method of integrating two or more collated partial sets of a document into one collated complete set of said document, each of said collated partial sets being located in a corresponding sheet feeder unit having a scanning device capable of reading machine readable information printed on sheets in said sheet feeder unit, said method comprising:

a) upon receipt of a start signal, feeding sheets toward a final destination from one of said collated partial sets located in one of said sheet feeder units until the scanning device associated with said one sheet feeder unit reads switching information from a sheet to be fed from said one sheet feeder unit indicating that the sheet feeder unit from which sheets are being fed should be changed;

b) feeding sheets toward said final destination from a different collated partial set located in a different sheet feeder unit than was immediately previously feeding sheets, based on immediately previously read switching information, until the scanning device associated with the different sheet feeder unit reads switching information from a sheet to be fed from said different sheet feeder unit indicating that the sheet feeder unit from which sheets are being fed should be changed; and c) repeating step (b) until the switching information read from a sheet indicates that all sheet feeding should stop;

wherein the sheets fed from each sheet feeder unit remain in collated order, with a first sheet fed from a sheet feeder unit after receipt of switching information being located immediately subsequent to a last sheet fed from a different sheet feeder unit immediately prior to receipt of said switching information, so that each group of sheets fed from each sheet feeder unit is merged at a common sheet path to form a collated complete document set.

12. The method of claim 11, wherein one of said sheet feeder units is an oversize sheet feeder unit containing at least some oversize sheets, and a sheet folder is located between said oversize sheet feeder unit and said common sheet path, and at least some of the oversize sheets from said oversize sheet feeder unit are folded by said sheet folder prior to insertion into said common sheet path.

13. The method of claim 12, wherein said sheet folder performs an action selected from the group consisting of: C-folding an oversize sheet, Z-folding an oversize sheet, and not folding the sheet.

14. The method of claim 12, wherein a sheet inverter is located between said sheet folder and said common sheet path, and further comprising folding and inverting all sheets fed from said oversize sheet feeder tray with said sheet folder and said sheet inverter, respectively, prior to insertion into said common sheet path.

15. The method of claim 11, wherein a hole puncher is located along said common sheet path, and further comprising punching holes in each sheet with said hole puncher prior to each sheet reaching said final destination.

16. A method of forming plural copies of a document having regular sheets and insert sheets comprising:

a) printing plural, unseparated collated partial sets of said document including the regular sheets of said document, each regular sheet located immediately prior to an insert sheet in said document being printed with machine readable indicia thereon indicative of the subsequent location in the document of an insert sheet;

b) printing and outputting plural sets of the insert sheets of said document into one or more different feeder units, a last insert sheet for each insert position in the document being printed with machine readable indicia thereon indicative of the end of an insertion operation;

c) rapidly sequentially feeding the collated regular sheets from an inlet to a final destination while scanning each regular sheet as it is fed with a first scanner;

d) upon detection by the first scanner of the machine readable indicia on a regular sheet indicative of the subsequent location of an insert sheet, stopping the feeding of regular sheets from said inlet after said regular sheet containing the machine readable indicia indicative of the subsequent location of an insert sheet is fed toward said final destination, and rapidly sequentially feeding one or more insert sheets from one of said one or more different feeder units to the final destination while scanning each insert sheet as it is fed with one or more insert sheet scanners;

e) upon detection by one of said insert sheet scanners of the machine readable indicia on an insert sheet indicative of the end of an insertion operation and after said insert sheet containing the machine readable indicia indicative of the end of an insertion operation is fed toward said final destination, stopping the feeding of insert sheets and resuming the rapid sequential feeding of regular sheets from said inlet; and f) repeating steps (c)–(e) until the document set is complete, wherein all regular and insert sheets fed from said inlet and said feeder units, respectively, reach said final destination.

17. The method of claim 16, wherein all insert sheets are output to a single common insert sheet feeder unit in collated order after being printed, so that only a single insert sheet scanner is provided, and so that the performance of steps (c)–(e) results in the feeding of sheets being switched between only said inlet for regular sheets, and said single common insert sheet feeder unit.

18. The method of claim 16, comprising:

a)i) placing the printed plural unseparated collated partial set of regular sheets in a single regular sheet feeder unit adjacent to said inlet; and wherein step (c) includes feeding said regular sheets from said feeder unit through said inlet.

19. The method of claim 16, wherein said insert sheets are oversize sheets having an area larger than an area of said regular sheets.

20. The method of claim 19, wherein all oversize sheets are output to a single common oversize sheet feeder unit after being printed, so that only a single oversize sheet scanner is provided, and so that the performance of steps (c)–(e) results in the feeding of sheets being switched between only said inlet for regular sheets and said single common oversize sheet feeder unit.

21. The method of claim 20, wherein a sheet folder is located between said single common oversize sheet feeder unit and said final destination, and further comprising:

d)i) folding each oversize sheet fed from said single common oversize sheet feeder unit with said sheet folder prior to reaching said final destination.

22. The method of claim 21, wherein all said oversize sheets are Z-folded by said sheet folder.

23. The method of claim 21, wherein a sheet inverter is located between said sheet folder and said final destination, and further comprising:

d)ii) inverting all folded oversize sheets with said sheet inverter prior to reaching said final destination.

24. The method of claim 16, wherein said machine readable indicia is located on a portion of said sheets which is not visible after binding of said document.

25. Apparatus for integrating two or more stacks of collated partial sets of a document into a single collated stack containing multiple sets of the document, at least some of the sheets in the document having machine readable indicia printed thereon indicative of the end of a collated continuous portion of the document contained in one of the stacks of collated partial sets of the document, said apparatus comprising:

a) at least two sheet feeder units, each sheet feeder unit for holding one of the stacks of collated partial sets of the document, and including:
   i) a corresponding sheet feeder for feeding a sheet from the sheet feeder unit toward a final destination when the sheet feeder unit is activated; and
   ii) a scanner for reading the machine readable indicia on sheets to be fed from the sheet feeder unit;

b) control means for:
   i) determining which sheet feeder unit should be activated based on the machine readable indicia contained on a sheet in an activated sheet feeder unit which is to be fed to said final destination, so as to maintain a collated output of sheets from said sheet feeder units; and
   ii) selectively activating one of the sheet feeder units based on said determination, by activating the sheet feeder associated with the sheet feeder unit to be activated, said control means simultaneously deactivating all sheet feeder units except for the sheet feeder unit to be activated;

c) a junction point located downstream of said at least two sheet feeder units, where sheets fed from said at least two sheet feeder units merge to form a collated stream of the complete document; and d) means, located downstream of said junction point and at the final destination, for receiving the collated stream of the complete document so as to receive multiple collated complete sets of the document, wherein all sheets fed from said sheet feeder units reach said final destination.

26. The apparatus of claim 25, wherein said means for receiving sheets is a high capacity stacker tray having a sheet inverter for inverting said output sheets as said output sheets are received by said stacker tray.

27. The apparatus of claim 25, wherein only two sheet feeder units are provided so that said control means alternately activates one of said two sheet feeder units.

28. The apparatus of claim 27, wherein a first one of said sheet feeder units is sized to hold regular size sheets, and a second one of said sheet feeder units is sized to hold oversize sheets, and further comprising:

a sheet folder, located between said second sheet feeder unit and said junction point, for folding oversize sheets output from said second sheet feeder unit.

29. The apparatus of claim 28, further comprising:

a sheet inverter, located between said sheet folder and said junction point, for inverting folded oversize sheets prior to reaching said means for receiving sheets.

30. The apparatus of claim 27, further comprising:

a common sheet conveyor located between said junction point and said means for receiving sheets, said common sheet conveyor including an endless rotating belt defining a common sheet path having a sheet inlet and a sheet outlet, said sheet inlet being in communication with a regular size sheet feeding path which carries sheets fed from said first sheet feeder unit, said sheet outlet being in communication with said means for receiving sheets, said sheet inverter placing inverted folded oversize sheets onto said endless rotating belt adjacent to said sheet inlet; and a blower, located adjacent to said inverter, for directing an air stream onto said endless rotating belt to prevent folded oversize sheets from fanning-out on said endless rotating belt after being placed on said endless belt by said sheet inverter.

31. The apparatus of claim 25, further comprising: a common sheet conveyor located between said junction point and said means for receiving sheets, and including an endless rotating belt defining a common sheet path having a sheet inlet in communication with said at least two sheet feeder units, and a sheet outlet in communication with said means for receiving sheets.

32. The apparatus of claim 31, further comprising:

a hole puncher located along said common sheet path for temporarily stopping and punching holes in said sheets.

33. Apparatus for integrating two or more stacks of collated partial sets of a document into a single collated stack containing multiple sets of the document, at least some of the sheets in the document having machine readable indicia printed thereon indicative of the end of a collated continuous portion of the document contained in one of the stacks of collated partial sets of the document, said apparatus comprising:

a) at least two sheet feeder units, each sheet feeder unit for holding one of the stacks of collated partial sets of the document, and including:

i) a corresponding sheet feeder for feeding a sheet from the sheet feeder unit toward a final destination when the sheet feeder unit is activated; and ii) a scanner for reading the machine readable indicia on sheets to be fed from the sheet feeder unit;

b) control means for:

i) determining which sheet feeder unit should be activated based on the machine readable indicia contained on a sheet in an activated sheet feeder unit, so as to maintain a collated output of sheets from said sheet feeder units; and ii) for selectively activating one of the sheet feeder units based on said determination, by activating the sheet feeder associated with the sheet feeder unit to be activated, said control means simultaneously deactivating all sheet feeder units except for the sheet feeder unit to be activated;

c) means, located at the final destination, for receiving sheets output by said sheet feeder units in collated order so as to receive multiple collated complete sets of the document;

d) a first one of said sheet feeder units being sized to hold regular size sheets and a second one of said sheet feeder units being sized to hold oversize sheets;

e) a sheet folder, located between said second sheet feeder unit and said means for receiving sheets, for folding oversize sheets output from said second sheet feeder unit;

f) a sheet inverter, located between said sheet folder and said means for receiving sheets, for inverting folded oversize sheets prior to reaching said means for receiving sheets;

g) a common sheet conveyor located between said sheet inverter and said means for receiving sheets, said common sheet conveyor including an endless rotating belt defining a common sheet path having a sheet inlet and a sheet outlet, said sheet inlet being in communication with a regular size sheet feeding path which carries sheets fed from said first sheet feeder unit, said sheet outlet being in communication with said means for receiving sheets, said sheet inverter placing inverted folded oversize sheets onto said endless rotating belt adjacent to said sheet inlet; and h) a blower, located adjacent to said inverter, for directing an air stream onto said endless rotating belt to prevent folded oversize sheets from fanning-out on said endless rotating belt after being placed on said endless belt by said sheet inverter.

* * * * *